(12) United States Patent  
Morimoto et al.

(10) Patent No.: US 8,848,240 B2
(45) Date of Patent: Sep. 30, 2014

(54) IMAGE PROCESSING APPARATUS, IMAGE READING APPARATUS, IMAGE FORMING APPARATUS, IMAGE PROCESSING METHOD, AND RECORDING MEDIUM

(75) Inventors: Atsuhisa Morimoto, Osaka (JP); Yohsuke Konishi, Osaka (JP); Hitoshi Hirohata, Osaka (JP); Akihito Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 326 days.

(21) Appl. No.: 13/164,986

(22) Filed: Jun. 21, 2011

(65) Prior Publication Data

US 2011/0310414 A1    Dec. 22, 2011

(30) Foreign Application Priority Data

Jun. 21, 2010 (JP) .................................. 2010-140878

(51) Int. Cl.
*H04N 1/04* (2006.01)
*G06K 15/02* (2006.01)
*H04N 1/46* (2006.01)

(52) U.S. Cl.
USPC ............. 358/1.9; 358/488; 358/474; 358/1.2; 358/522; 382/168; 382/170; 382/177; 382/159; 382/176; 348/1.2; 348/208.99; 348/168; 348/208.14

(58) Field of Classification Search
USPC .......... 358/488, 474; 382/305, 177, 176, 308; 348/E5.055
See application file for complete search history.

(56) References Cited

U.S. PATENT DOCUMENTS

| 6,493,462 | B1 * | 12/2002 | Inoue ............................ 382/170 |
| 8,085,308 | B2 * | 12/2011 | Icho et al. ................ 348/208.99 |
| 8,218,193 | B2 * | 7/2012 | Kim .............................. 358/1.2 |
| 8,260,041 | B2 * | 9/2012 | Ogawa ......................... 382/159 |
| 8,331,672 | B2 * | 12/2012 | Oh et al. ....................... 382/177 |
| 2006/0115185 | A1 * | 6/2006 | Iida et al. ...................... 382/305 |
| 2007/0146814 | A1 * | 6/2007 | Asada .......................... 358/474 |
| 2008/0025558 | A1 | 1/2008 | Nozawa |
| 2008/0100885 | A1 * | 5/2008 | Onishi ......................... 358/488 |
| 2008/0297859 | A1 | 12/2008 | Iwatsuka |

FOREIGN PATENT DOCUMENTS

| JP | 2006-146428 | 6/2006 |
| JP | 2007-174479 | 7/2007 |
| JP | 2007-201752 | 8/2007 |
| JP | 2008-027401 | 2/2008 |
| JP | 2008-113075 | 5/2008 |
| JP | 2008-301168 | 12/2008 |

* cited by examiner

*Primary Examiner* — Akwasi M Sarpong
(74) *Attorney, Agent, or Firm* — Edwards Wildman Palmer LLP; David G. Conlin; David A. Tucker

(57) ABSTRACT

An object area containing a text or a graphic is extracted from a document image containing the text or the graphic. Then, on the basis of the extracted object area and stored size information, a cropping area is determined that surrounds the object area with given margins. Further, setting of margins is received. Then, on the basis of the object area and the received setting of the margins, the cropping area is determined. Then, the cropping area determined on the basis of the object area and the size information or alternatively the cropping area determined on the basis of the object area and the setting of the margins is cropped from the document image.

5 Claims, 24 Drawing Sheets

FIG. 7

SIZE INFORMATION TABLE

| STANDARD SHEET | STANDARD SHEET SIZE (inch) | | REDUCED SIZE (PIXELS CORRESPONDING TO 600 dpi) | |
|---|---|---|---|---|
| | HEIGHT | WIDTH | HEIGHT | WIDTH |
| A3 (420×297) | 16.54 | 11.69 | 9928 | 7016 |
| B4 (364×257) | 14.33 | 10.12 | 8600 | 6072 |
| A4 (297×210) | 11.69 | 8.27 | 7016 | 4960 |
| B5 (257×182) | 10.12 | 7.17 | 6072 | 4304 |
| A5 (210×148) | 8.27 | 5.83 | 4960 | 3496 |

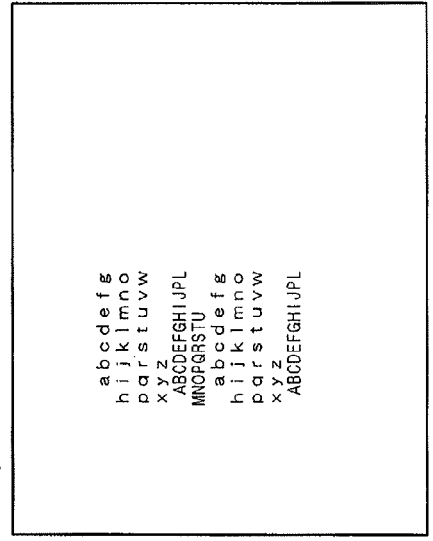
FIG. 10B
READ IMAGE
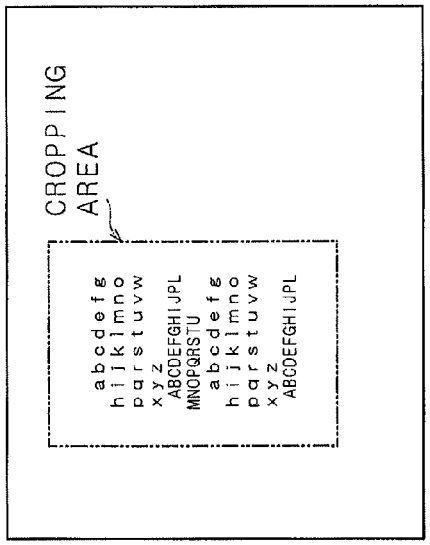
FIG. 10D
CALCULATED CROPPING AREA
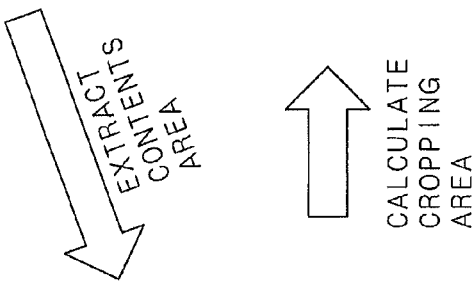
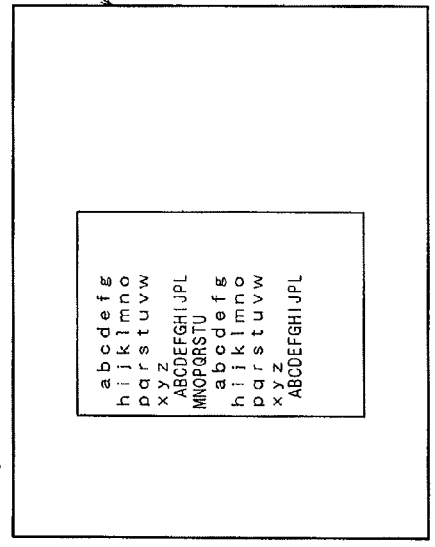
FIG. 10A
STATE OF PLACED DOCUMENT
FIG. 10C
EXTRACTED CONTENTS AREA F I G. 1 2
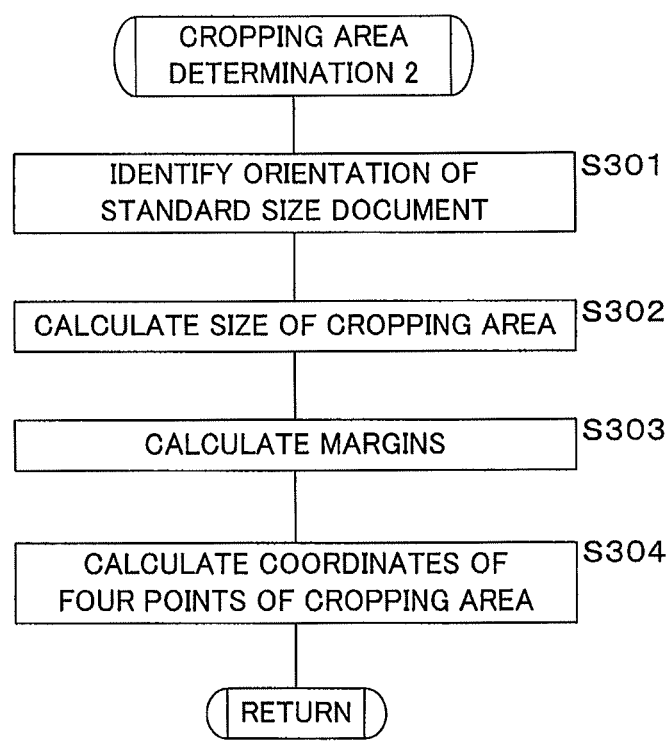

F I G. 1 3
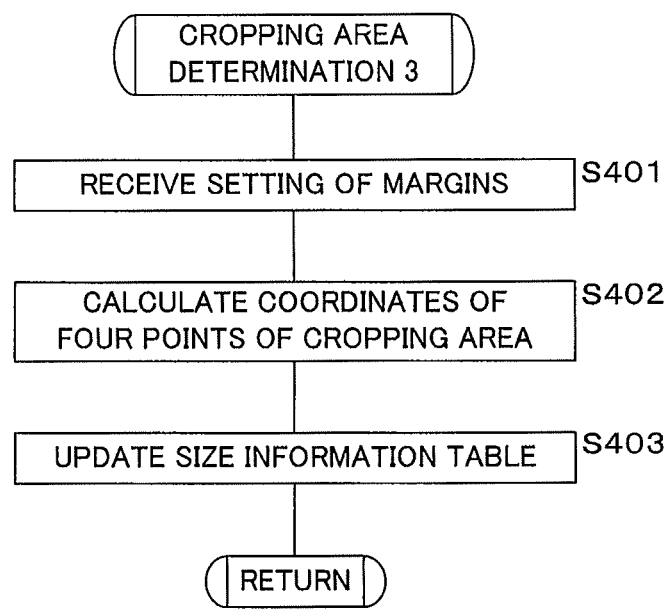

FIG. 14

SIZE INFORMATION TABLE

| STANDARD SHEET | STANDARD SHEET SIZE (inch) | | REDUCED SIZE (PIXELS CORRESPONDING TO 600 dpi) | |
|---|---|---|---|---|
| | HEIGHT | WIDTH | HEIGHT | WIDTH |
| A3 (420X297) | 16.54 | 11.69 | 9928 | 7016 |
| B4 (364X257) | 14.33 | 10.12 | 8600 | 6072 |
| A4 (297X210) | 11.69 | 8.27 | 7016 | 4960 |
| B5 (257X182) | 10.12 | 7.17 | 6072 | 4304 |
| A5 (210X148) | 8.27 | 5.83 | 4960 | 3496 |
| NON-STANDARD SHEET SIZE 1 (91X55) | 3.58 | 2.16 | 2148 | 1296 |

FIG. 15A
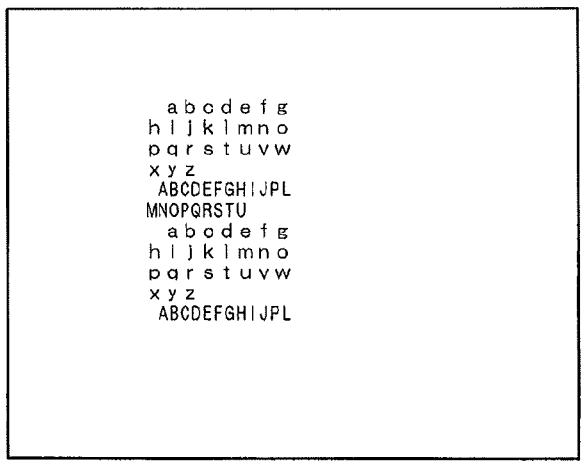
READ IMAGE
FIG. 15B
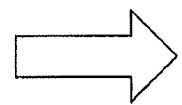
CROP
CROPPING
AREA
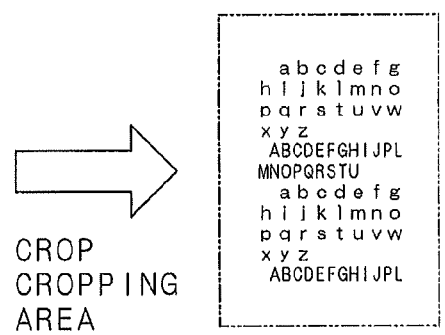
OUTPUT DOCUMENT
IMAGE

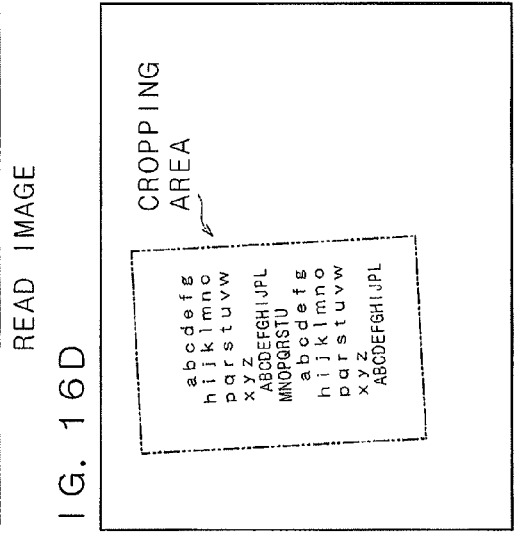
FIG. 16B READ IMAGE
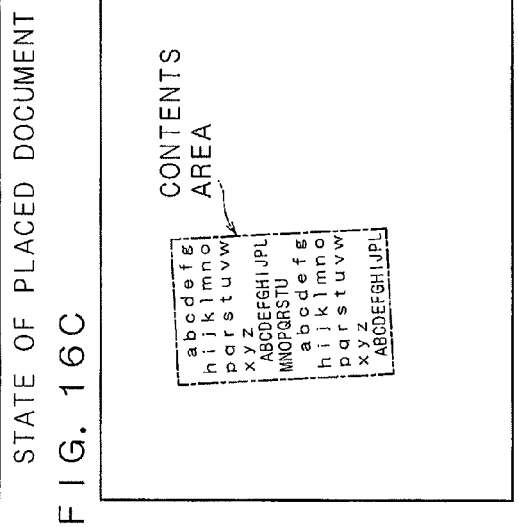
FIG. 16D CALCULATED CROPPING AREA
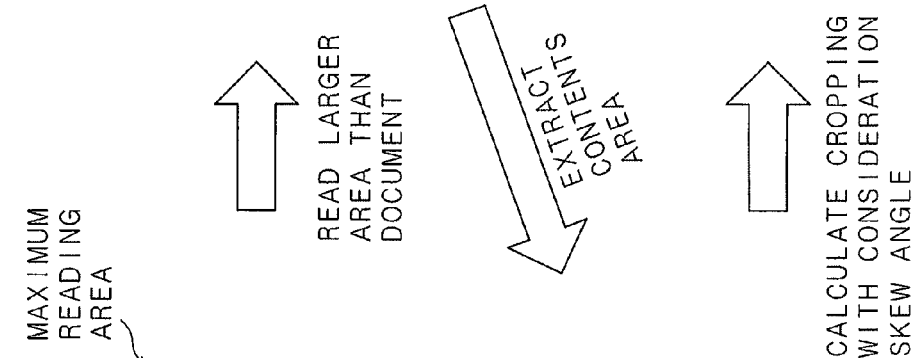
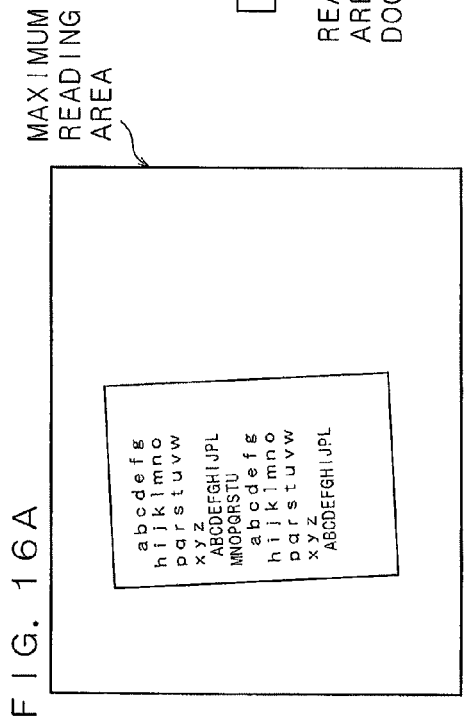
FIG. 16A STATE OF PLACED DOCUMENT
FIG. 16C EXTRACTED CONTENTS AREA

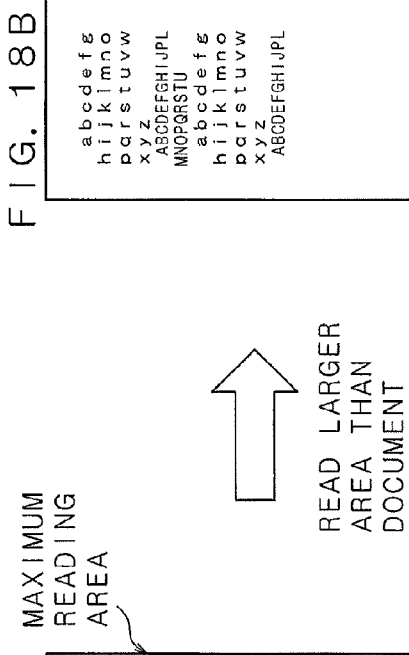
FIG. 18A
STATE OF PLACED DOCUMENT
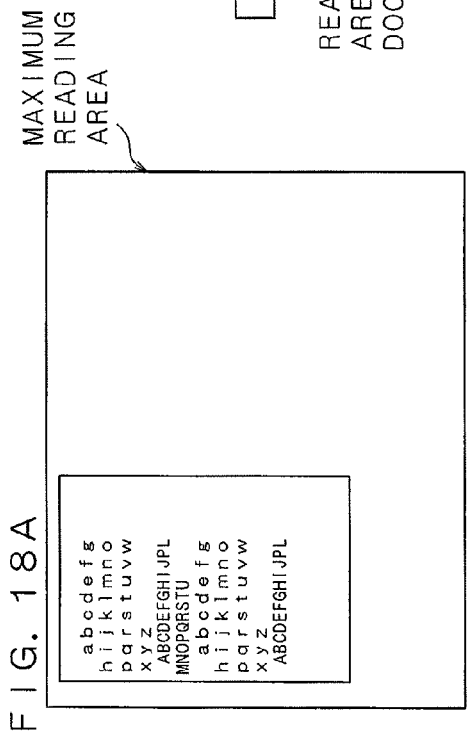
FIG. 18B
READ IMAGE
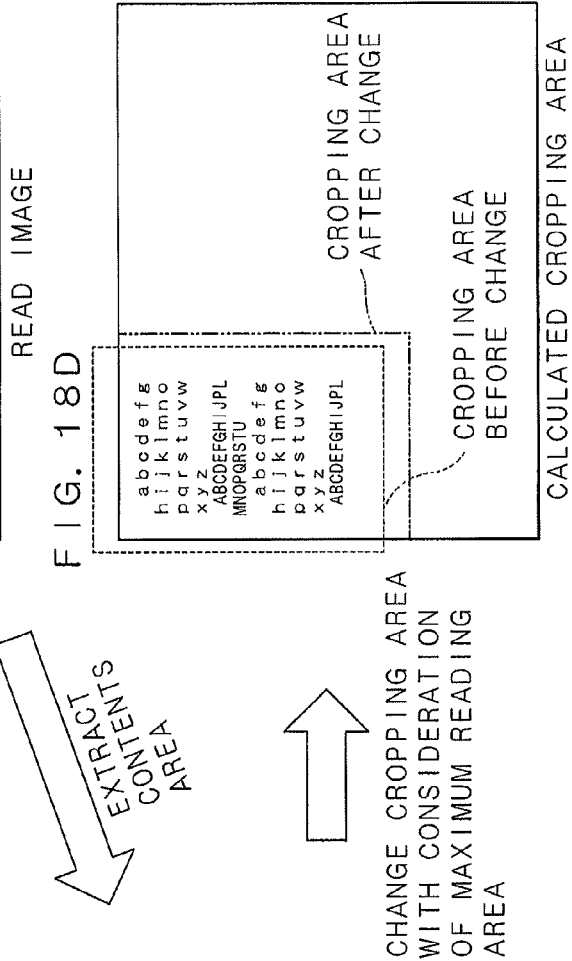
FIG. 18C
EXTRACTED CONTENTS AREA
FIG. 18D
CALCULATED CROPPING AREA

PLACE DOCUMENT ON SCANNER PLATEN

READ IMAGE

STATE OF READING DOCUMENT
BY USING AUTOMATIC DOCUMENT FEEDER

READ IMAGE

IMAGE PROCESSING APPARATUS, IMAGE READING APPARATUS, IMAGE FORMING APPARATUS, IMAGE PROCESSING METHOD, AND RECORDING MEDIUM

CROSS-REFERENCE TO RELATED APPLICATIONS

This Nonprovisional application claims priority under 35 U.S.C. §119(a) on Patent Application No. 2010-140878 filed in Japan on Jun. 21, 2010, the entire contents of which are hereby incorporated by reference.

BACKGROUND

1. Technical Field

The present invention relates to: an image processing apparatus, an image reading apparatus, an image forming apparatus, an image processing method, and a computer program performing a cropping process on a document image containing a text or a graphic; and a recording medium storing the computer program.

2. Description of Related Art

In the prior art, a technique is known that a part of an image (a document image) obtained by reading a document is identified and then the identified part is cropped alone. Another technique is also known that the edges of such a document image are calculated and then the entire document image is cropped.

For example, in a reading control system described in Japanese Patent Application Laid-Open No. 2007-174479, an image reading apparatus reads a document in an achievable maximum area, then information indicating the sheet size of the document is received from a user, and then an area having the sheet size indicated by the received information is calculated as a crop box in the read-out document image. Specifically, in the reading control system described in Japanese Patent Application Laid-Open No. 2007-174479, in the image acquired by reading the document in the achievable maximum area, a part having an image density exceeding a threshold having been set up in advance is detected as an area where a significant image is present. Then, a shape and an area that agree with the sheet size of the document are calculated as the crop box. For example, when the area of the crop box is adopted such that the area where a significant image is present should be located in the center of the area of the crop box, the image of the document is displayed appropriately even when the document has been read in a position deviated from an appropriate alignment.

Further, in an image input apparatus described in Japanese Patent Application Laid-Open No. 2007-201752, size information concerning the horizontal and vertical lengths of each standard sheet size is stored in advance. Next, image data with a given size is read from a document, and then the size of the document part is calculated from the read-out image data. Then, in the image input apparatus described in Japanese Patent Application Laid-Open No. 2007-201752, the calculated size of the document part is compared with the size information, and finally the image data is cropped into a sheet size closest to the size of the document part.

SUMMARY

Nevertheless, in the reading control system described in Japanese Patent Application Laid-Open No. 2007-174479, the user needs to input a sheet size. Thus, the user should be familiar with sheet sizes. For example, when a plurality of documents with various sizes are to be read, a sheet size should be inputted for each document. This causes a problem of user unfriendliness.

Further, the reading control system described in Japanese Patent Application Laid-Open No. 2007-174479 and the image input apparatus described in Japanese Patent Application Laid-Open No. 2007-201752 do not support a document of non-standard sheet size.

The present invention has been devised in view of such situations. The object of the present invention is to provide: an image processing apparatus, an image reading apparatus, an image forming apparatus, an image processing method, and a computer program capable of appropriately cropping an object area of an acquired document image without the necessity of receiving an instruction of the size of the document from a user, in whatever case that the document is in any standard sheet size or in any non-standard sheet size; and a computer-readable recording medium storing the computer program.

The image processing apparatus according to the present invention is an image processing apparatus performing a cropping process on a document image containing a text or a graphic, comprising: extraction means for extracting an object area containing the text or the graphic from the document image; first determination means for determining a cropping area surrounding the object area with given margins on the basis of the object area extracted by the extraction means and pre-stored size information of an image; setting reception means for receiving setting of the margins; second determination means for determining the cropping area on the basis of the object area and the received setting of the margins; and cropping means for cropping the cropping area determined by the first determination means or the second determination means from the document image.

In the present invention, the extraction means extracts an object area containing a text or a graphic from a document image containing the text or the graphic. Then, the first determination means determines a cropping area on the basis of the object area extracted by the extraction means and pre-stored size information of an image. The second determination means determines the cropping area on the basis of the object area and the setting of the margins received by the setting reception means. The cropping means crops the cropping area determined by the first determination means or the second determination means from the document image.

The image processing apparatus according to the present invention further comprises instruction reception means for receiving an instruction whether a size of the document image is stored as size information or not, wherein the cropping area to be cropped by the cropping means is determined on the basis of the instruction received by the instruction reception means.

In the present invention, the instruction reception means receives an instruction whether the size of the document image is stored as size information or not. For example, when the instruction reception means has received an instruction that the size is stored as size information, the cropping means crops the cropping area determined by the first determination means. On the other hand, when the instruction reception means has received an instruction that the size is not stored as size information, the cropping means crops the cropping area determined by the second determination means.

The image processing apparatus according to the present invention comprises: coordinate calculation means for calculating coordinates identifying the cropping area; and judgment means for judging whether the cropping area is completely contained within given coordinate ranges or not, on the basis of the calculation result obtained by the coordinate calculation means, wherein when the judgment means for judges that the cropping area is not completely contained within the coordinate ranges, the first determination means or the second determination means changes the cropping area such as to be completely contained within the coordinate ranges.

In the present invention, the judgment means judges whether the cropping area is completely contained within given coordinate ranges or not, on the basis of the calculation result obtained by the coordinate calculation means. When the judgment means judges that the cropping area is not completely contained within the coordinate ranges, the first determination means or the second determination means changes the cropping area to be completely contained within the coordinate ranges.

In the image processing apparatus according to the present invention, the cropping area size determined by the second determination means is stored as the size information.

In the present invention, when the second determination means determines the cropping area, the cropping area size determined by the second determination means is stored as the size information.

The image reading apparatus according to the present invention comprises: image reading means for reading an image of a document; and the above-mentioned image processing apparatus, wherein the image processing apparatus performs a cropping process on the document image read by the image reading means.

In the present invention, the image processing apparatus determines a cropping area on the document image read by the image reading means and then crops the determined cropping area.

The image forming apparatus according to the present invention comprises: the above-mentioned image processing apparatus; and image forming means for forming an image corresponding to the cropping area obtained by the cropping process performed by the image processing apparatus onto a sheet-like recording medium.

In the present invention, the first determination means or the second determination means determines a cropping area in the document image. The cropping means crops the cropping area determined by the first determination means or the second determination means. Then, the image forming means forms an image in correspondence to the cropping area cropped from the document image, onto a sheet-like recording medium.

The image processing method according to the present invention is an image processing method performing a cropping process on a document image containing a text or a graphic, comprising: an extraction step of extracting an object area containing the text or the graphic from the document image; a first determination step of determining a cropping area surrounding the object area with given margins on the basis of the object area extracted during the extraction step and pre-stored size information of an image; a setting reception step of receiving setting of the margins; a second determination step of determining the cropping area on the basis of the object area and the received setting of the margins; and a cropping step of cropping the cropping area determined by the first determination step or the second determination step from the document image.

The computer program according to the present invention is a computer program for causing a computer provided with storage means for storing size information of an image to perform a cropping process on a document image containing a text or a graphic, the computer program comprising: an extraction step of causing the computer to extract an object area containing the text or the graphic from the document image; a first determination step of causing the computer to determine a cropping area surrounding the object area with given margins on the basis of the object area extracted during the extraction step and the size information stored in the storage section; a second determination step of causing the computer to determine the cropping area on the basis of the object area and setting of the margins; and a cropping step of causing the computer to crop the cropping area determined by the first determination step or the second determination step from the document image.

In the present invention, at the extraction step, an object area containing a text or a graphic is extracted from a document image containing the text or the graphic. Then, at the first determination step, a cropping area is determined on the basis of the extracted object area and the stored size information. At the second determination step, the cropping area is determined on the basis of the object area and the setting of the margins. At the cropping step, the cropping area determined by the first determination step or the second determination step is cropped from the document image containing the text or the graphic.

The image processing method according to the present invention further comprises: an instruction reception step of receiving an instruction whether a size of the document image is stored as size information or not; and a third determination step of determining the cropping area to be cropped during the cropping step on the basis of the instruction received during the instruction reception step.

The computer program according to the present invention further comprising a third determination step of causing the computer to determine the cropping area to be cropped during the cropping step on the basis of an instruction whether a size of the document image is stored as size information in the storage section or not.

In the present invention, an instruction is received whether the size of the document image is stored as size information or not. For example, when an instruction that the size of the document image is stored as size information has been received, the cropping area determined by the first determination step is cropped from the document image at the cropping step. On the other hand, when an instruction that the size of the document image is not stored as size information has been received, the cropping area determined by the second determination step is cropped from the document image containing a text or a graphic at the cropping step.

In the recording medium according to the present invention, the above-mentioned computer program is recorded in a computer-readable manner.

In the present invention, the above-mentioned computer program is stored in the recording medium. Next, a computer reads the computer program from the recording medium, and then executes the read-out computer program to implement the above-mentioned image processing method.

According to the present invention, when a document image is to be processed, an object area of an acquired document image is cropped appropriately without the necessity of receiving an instruction of the size of the document from a user, in whatever case that the document is in any standard sheet size or in any non-standard sheet size.

The above and further objects and features will more fully be apparent from the following detailed description with accompanying drawings.

BRIEF DESCRIPTION OF THE SEVERAL VIEWS OF THE DRAWINGS

FIG. 7 is a conceptual diagram illustrating a size information table stored in a storage section.

FIGS. 10A, 10B, 10C, and 10D are explanatory diagrams illustrating process steps of a cropping process performed by a digital multi-function peripheral.

FIG. 12 is a flowchart illustrating processing of cropping area determination performed by a second cropping area determining section.

FIG. 13 is a flowchart illustrating processing of cropping area determination performed by a third cropping area determining section.

FIG. 14 is an illustrative diagram describing update of a size information table stored in a storage section of a digital multi-function peripheral.

FIGS. 15A and 15B are explanatory diagrams illustrating a result of a cropping process performed by a digital multi-function peripheral.

FIGS. 16A, 16B, 16C, and 16D are explanatory diagrams illustrating calculation of a cropping area performed on an obliquely placed document by a digital multi-function peripheral.

FIGS. 18A, 18B, 18C, and 18D are explanatory diagrams illustrating processing of changing a cropping area performed by a digital multi-function peripheral.

DETAILED DESCRIPTION

The image forming apparatus according to the present invention is described below in detail with reference to the drawings for an example of application in a digital multi-function peripheral.

The digital multi-function peripheral according to the present invention is capable of acquiring a document image and then performing a cropping process. Here, the cropping process differs depending on either the document is in a so-called standard sheet size or in a non-standard sheet size.

Embodiment 1

Figure 1:
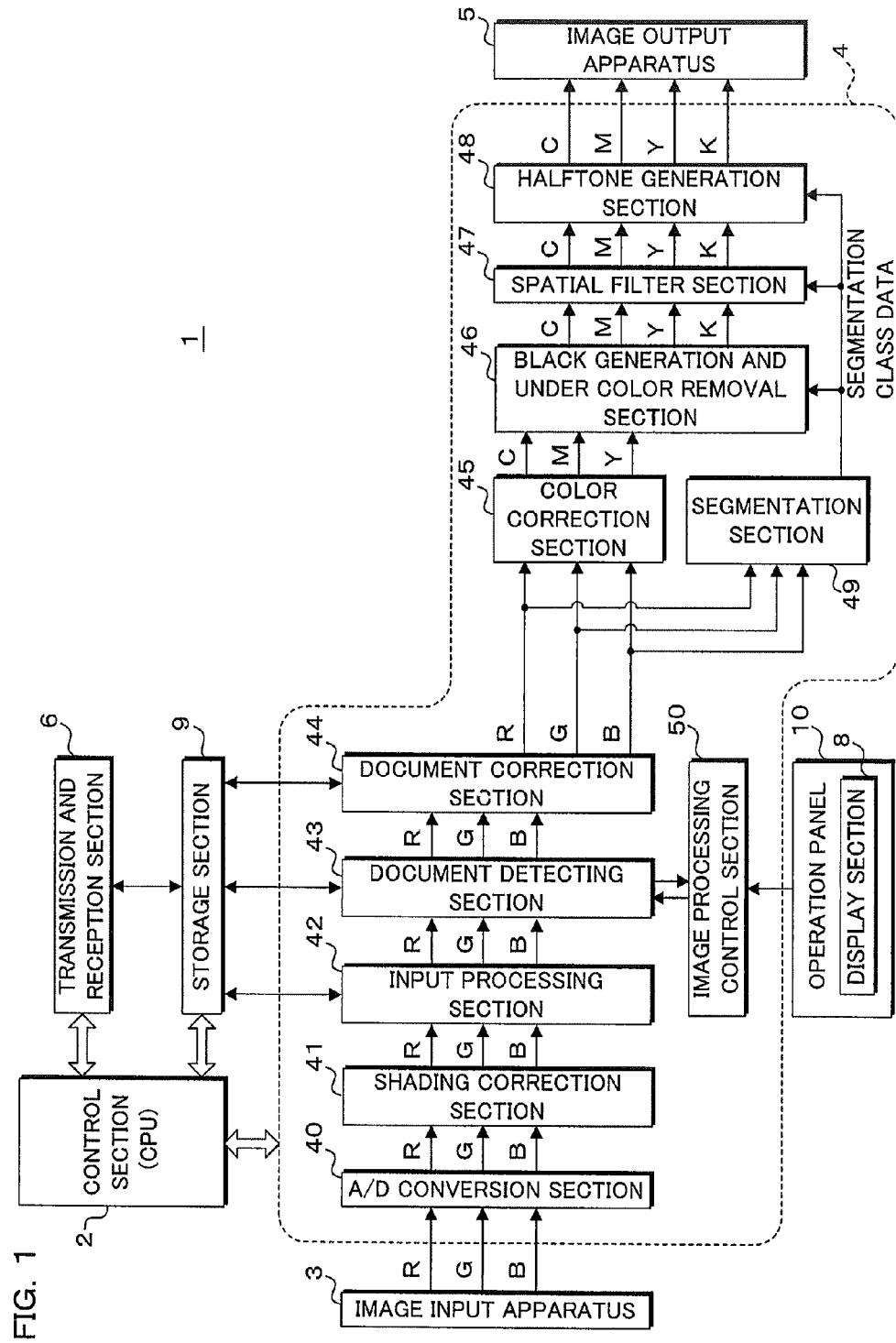
FIG. 1 is a block diagram illustrating a main part configuration of a digital multi-function peripheral according to Embodiment 1 of the present invention.

FIG. 1 is a block diagram illustrating a main part configuration of a digital multi-function peripheral 1 according to Embodiment 1 of the present invention. The digital multi-function peripheral 1 according to Embodiment 1 of the present invention has a control section 2, an image input apparatus 3, an image output apparatus 5, an image processing apparatus 4, a transmission and reception section 6, a storage section 9 and an operation panel 10. Further, the operation panel 10 has a display section 8.

The image input apparatus 3 (an image reading section) optically reads an image of a document. Further, the image input apparatus 3 has: a light source projecting light on a document; and an image sensor such as a CCD (Charge Coupled Device). The image sensor focuses an image of the light reflected from the document placed on a scanner platen. The image input apparatus 3 outputs analog data of RGB (R: Red, G: Green, B: Blue) obtained by this image focus to the image processing apparatus 4.

For example, on the basis of analog data of an image (a document image) of a document inputted through the image input apparatus 3, the image processing apparatus 4 generates image data in a digital format. Alternatively, the image processing apparatus 4 reads image data stored in the storage section 9. The image processing apparatus 4 performs processing corresponding to the type of the image onto the generated image data or the read-out image data, and then performs a cropping process on the document image to generate image data for output. Then, the image data for output is outputted through the transmission and reception section 6 to the outside, or alternatively an image generated on the basis of the image data for output is outputted through the image output apparatus 5 or the display section 8.

Further, the image processing apparatus 4 has an A/D (analog/digital) conversion section 40, a shading correction section 41, an input processing section 42, a document detecting section 43, a document correction section 44, a color correction section 45, a black generation and under color removal section 46, a spatial filter section 47, a halftone generation section 48, an segmentation section 49, and an image processing control section 50.

The A/D conversion section 40 acquires analog data of RGB from the image input apparatus 3, and then converts the acquired analog data into digital data. The shading correction section 41 removes various kinds of distortion generated by the illumination system, the image focusing system, and the imaging sensing system of the image input apparatus 3, from the RGB data in a digital format transmitted from the A/D conversion section 40.

The input processing section 42 performs gamma correction on the RGB data (reflectivity data of RGB) from which various kinds of distortion have been removed by the shading correction section 41, so that color balance is adjusted. Further, the input processing section 42 converts the RGB data into density (pixel values) data. The data of document image (referred to as document image data, hereinafter) having undergone such processing are temporarily stored into the storage section 9 as an example.

When selecting a crop mode described later, the document detecting section 43 extracts the document skew and a contents area (an object area) described later by using the document image data temporarily stored in the storage section 9 or alternatively document image data inputted through the input processing section 42. The document detecting section 43 calculates (determines) a cropping area on which a cropping process is to be performed, from the document image of the document image data acquired from the storage section 9 or the input processing section 42.

Figure 2:
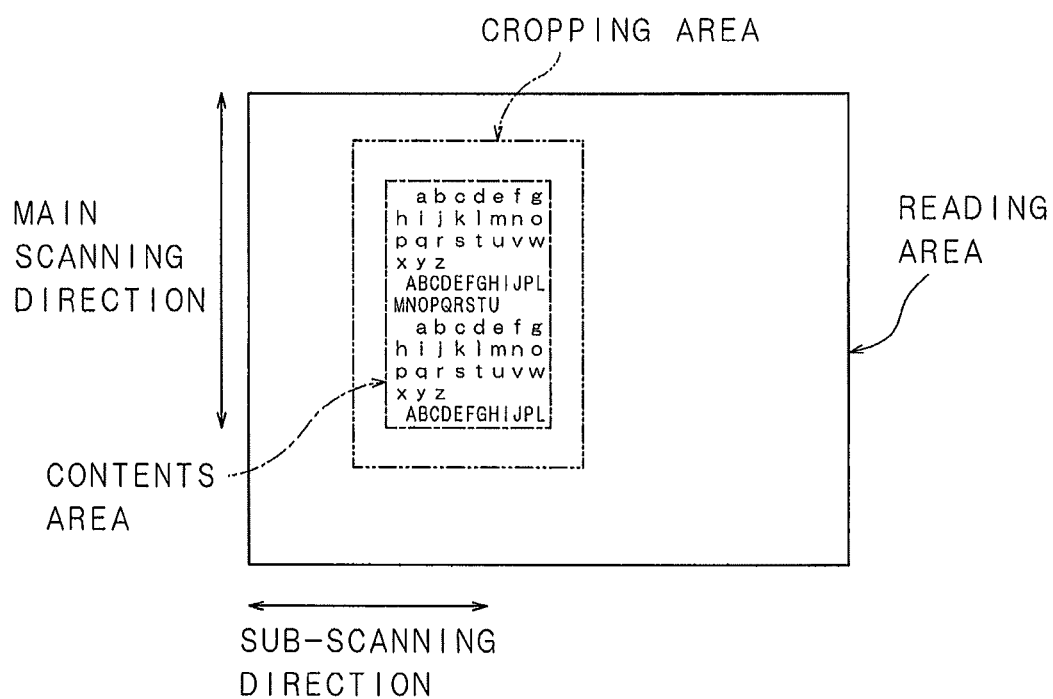
FIG. 2 is an explanatory diagram describing a contents area and a cropping area.

FIG. 2 is an explanatory diagram describing a contents area and a cropping area. For convenience of description, in Embodiment 1, it is assumed that a document containing an object such as a text or a graphic is placed at a given position of a scanner platen in such a manner that the longitudinal side of the document is in the main scanning direction and that the image of the placed document is read within an area size approximately equal to the scanner platen. In FIG. 2, a solid line indicates the rectangular reading area, which is read by the image input apparatus 3.

The contents area contains the object of the document image acquired by the image input apparatus 3, and is occupied by the object. The contents area is extracted, for example, on the basis of a sequence of boundary points between black pixels and white pixels or alternatively on the basis of the edges of the part where a text or a graphic is expressed in the document image. In FIG. 2, a dash-dotted line indicates the contents area.

Further, the cropping area has a shape similar to the contents area, and contains the contents area. Furthermore, a dashed double-dotted line indicates the cropping area. Then, a cropping process is performed on the cropping area. That is, the image part corresponding to the cropping area is cropped from the document image acquired by the image input apparatus 3.

Figure 3:
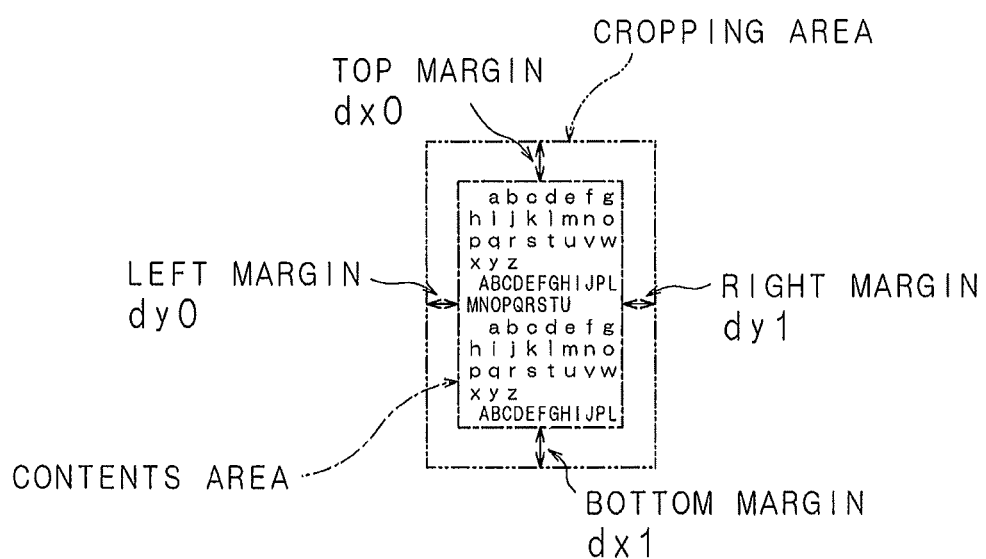
FIG. 3 is an explanatory diagram describing margins between a contents area and a cropping area.

The cropping area surrounds the contents area with given margins. FIG. 3 is an explanatory diagram describing the margins between a contents area and a cropping area. The cropping area surrounds the contents area with a top margin (dx0), a bottom margin (dx1), a left margin (dy0), and a right margin (dy1) in the vertical and horizontal directions. In Embodiment 1, setting of the values of dx0, dx1, dy0, and dy1 is received from the user through the setting reception section 442 as described later. However, the employed method of setting the values of dx0, dx1, dy0, and dy1 is not limited to this, and given default values may be stored as the values of dx0, dx1, dy0, and dy1 in the storage section 9.

Figure 4:
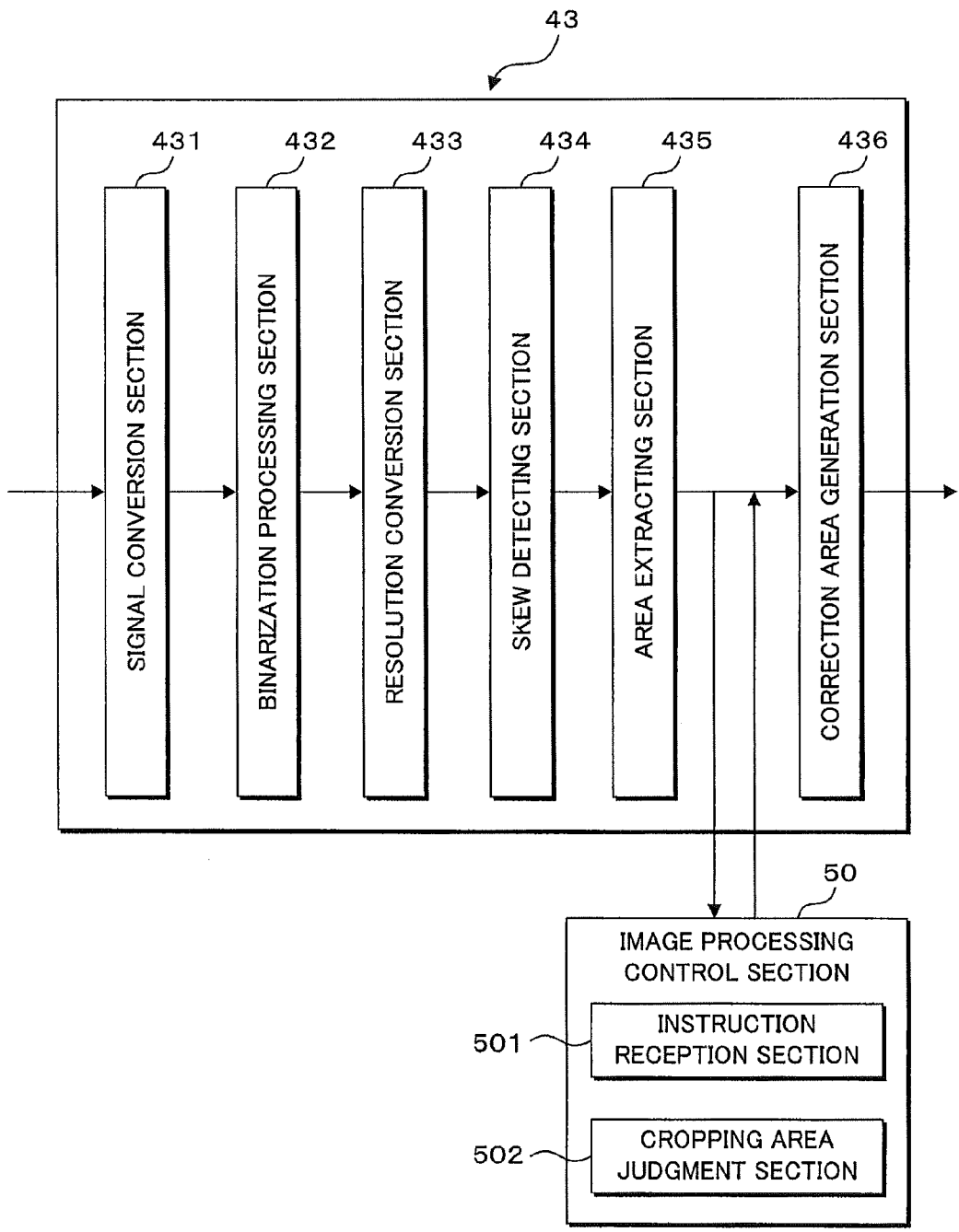
FIG. 4 is a functional block diagram illustrating a main part configuration of a document detecting section and an image processing control section in a digital multi-function peripheral.

FIG. 4 is a functional block diagram illustrating a main part configuration of the document detecting section 43 and the image processing control section 50 in the digital multi-function peripheral 1.

The document detecting section 43 has a signal conversion section 431, a binarization processing section 432, a resolution conversion section 433, a skew detecting section 434, an area extracting section 435, and a correction area generation section 436.

The signal conversion section 431 converts, for example, the color image data of RGB of the document image data to be processed, into luminance signals in accordance with a formula Yi=0.30Ri+0.59Gi+0.11Bi. Here, Y denotes a luminance signal at each pixel. R, G, and B denote the values of respective color components (Red, Green, and Blue) at each pixel. Suffix i (i is a natural number) indicates each pixel.

Alternatively, the RGB signals may be converted into CIE1976 L*a*b* signals (CIE: Commission International de l'Eclairage; L*: lightness, a*: redness-greenness, b*: yellowness-blueness). Further, a G signal may be employed instead of the RGB signals.

The binarization processing section 432 binarizes the document image data with reference to a threshold. When the document image data is of 8 bits, the employed threshold may be 128. Further, the average of the densities (pixel values) in a block consisting of a plurality of pixels (e.g., 5×5) may be employed as the threshold.

The resolution conversion section 433 reduces the resolution of the document image data having undergone binarization in the binarization processing section 432. For example, the resolution conversion section 433 converts the document image data read in a resolution of 1200 dpi or 600 dpi into a resolution of 300 dpi. This resolution conversion is performed by a nearest neighbor method, a bilinear method, or a bicubic method which are publicly known.

The skew detecting section 434 extracts a plurality of boundary points between black pixels and white pixels from the binarized image data, and then calculates the coordinate data of the sequence of the boundary points. In the specific example, the coordinates of a white-black boundary point are calculated at the upper end of each character, and then the coordinate data of the calculated coordinates are stored into a memory (not illustrated).

With reference to the point sequence coordinate data, the skew detecting section 434 calculates a regression line from these point sequence coordinates, then calculates a regression coefficient b in accordance with the following formula, and then stores the calculated regression coefficient b into the memory.

$$b = \frac{Sxy}{Sx} \quad (1)$$

Here, Sx and Sy denote the error sums of squares of variables x and y, respectively. Further, Sxy denotes the sum of the products of the residual of x and the residual of y. These quantities are expressed in the following formulas.

$$Sx = \sum_{i=1}^{n}(x_i - \overline{x})^2 = \sum_{i=1}^{n} x_i^2 - \left(\sum_{i=1}^{n} x_i\right)^2 \bigg/ n \quad (2)$$

$$Sy = \sum_{i=1}^{n}(y_i - \overline{y})^2 = \sum_{i=1}^{n} y_i^2 - \left(\sum_{i=1}^{n} y_i\right)^2 \bigg/ n \quad (3)$$

$$Sxy = \sum_{i=1}^{n}(x_i - \overline{x})(y_i - \overline{y}) = \sum_{i=1}^{n} x_i y_i - \left(\sum_{i=1}^{n} x_i\right)\left(\sum_{i=1}^{n} y_i\right) \bigg/ n \quad (4)$$

When the regression coefficient b obtained in accordance with formula (1) is substituted into the following formula, the skew angle (θ) of the document image (or the document) can be calculated.

$$\tan \theta = b \quad (5)$$

Figure 5A:
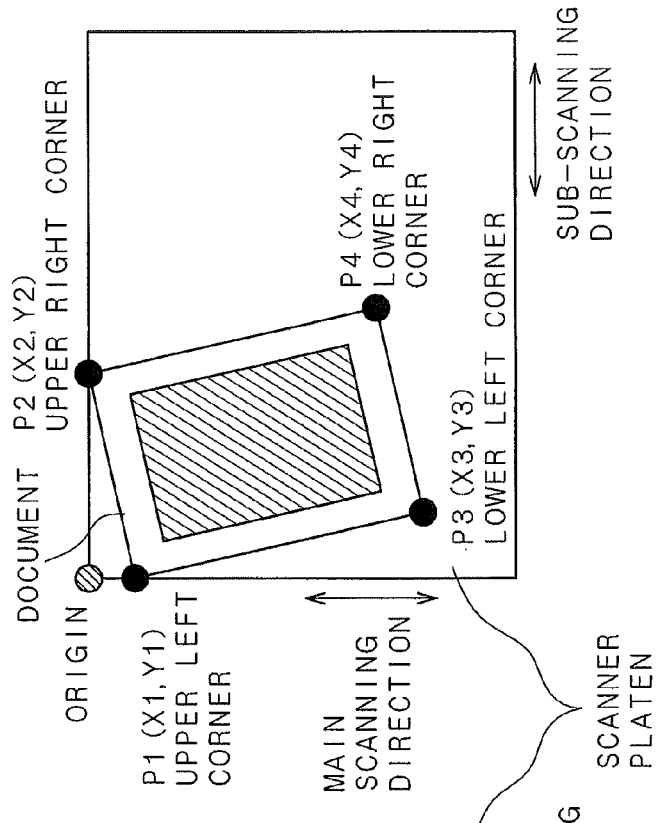
FIGS. 5A and 5B are explanatory diagrams describing extraction of a contents area performed by an area extracting section.
Figure 5B:
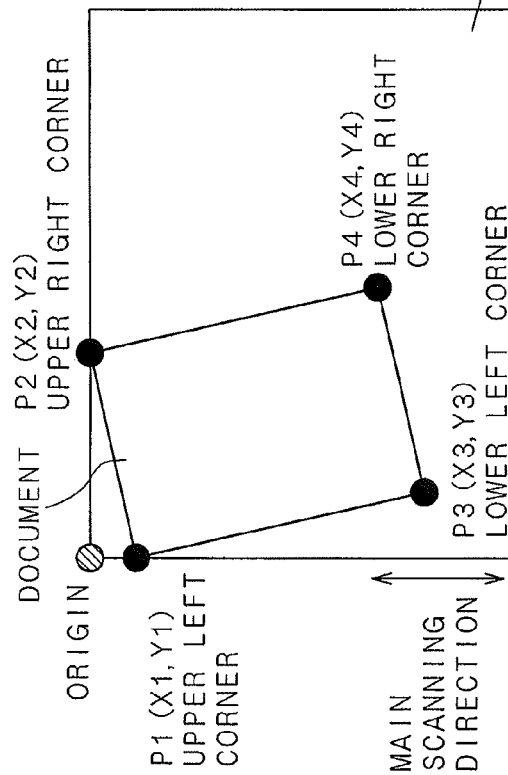

The area extracting section 435 (an extraction section) detects the edges of the document image as an example, then calculates the coordinates of each corner on the basis of the detected edges, and then extracts a contents area. FIGS. 5A and 5B are explanatory diagrams describing extraction of a contents area performed by the area extracting section 435.

First, in the document image data, in each line in the sub-scanning direction, among the pixel of interest and the pixels adjacent to the pixel of interest, the coordinates of a pixel on the leftmost side and the coordinates of a pixel on the rightmost side among the pixels having a pixel value greater than a threshold value (for example, 20) defined in advance are calculated as edge coordinates. Then, among the edge coordinates calculated for all lines in the document image data, the edge coordinates on the uppermost side, on the lowermost side, on the leftmost side, and on the rightmost side are extracted. As a result, as illustrated in FIGS. 5A and 5B, the upper left corner: P1 (X1, Y1), the lower left corner: P3 (X3, Y3), the lower right corner: P4 (X4, Y4), and the upper right corner: P2 (X2, Y2) are extracted as the coordinates of the corners.

For example, when the sheet color of the document is different from the color of the cover of the scanner platen serving as the background at the time of reading the document and hence the edges of the document image are detectable, the entire document is extracted as the contents area as illustrated in FIG. 5A. On the other hand, when the sheet color of the document is the same as the color of the cover of the scanner platen and hence the edges of the document image are not detectable, the part occupied by the object of the document image is extracted as the contents area, as illustrated in FIG. 5B.

Figure 6:
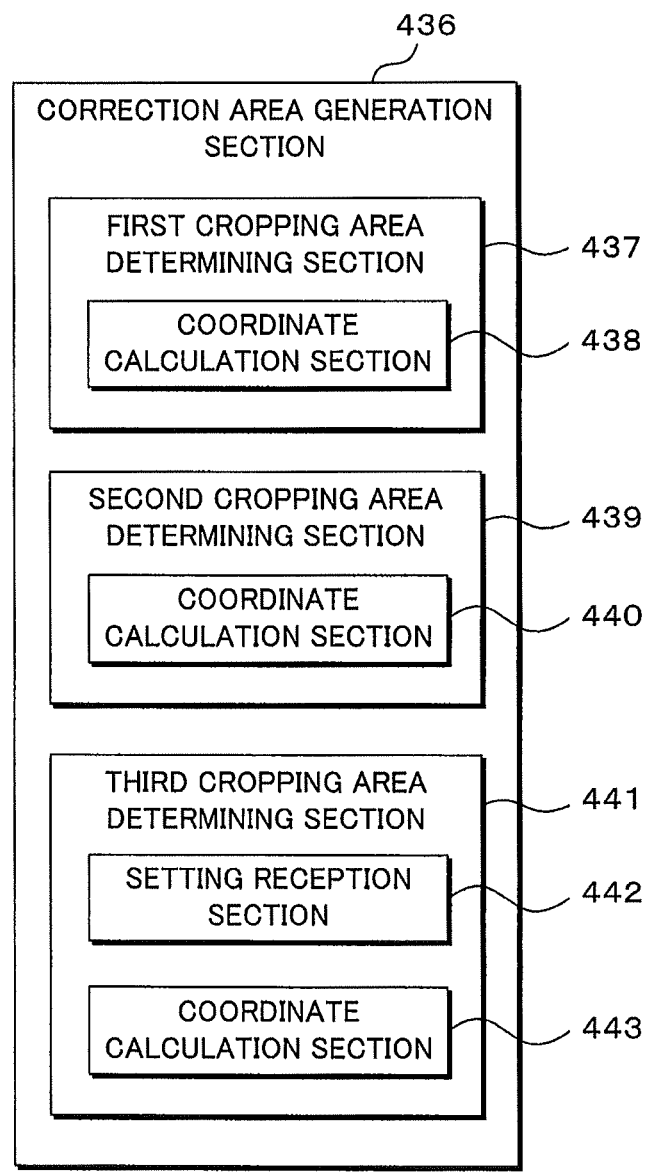
FIG. 6 is a functional block diagram illustrating a main part configuration of a correction area generation section.

The correction area generation section 436 determines a cropping area on which a cropping process is to be performed. FIG. 6 is a functional block diagram illustrating a main part configuration of the correction area generation section 436.

The correction area generation section 436 has a first cropping area determining section 437, a second cropping area determining section 439, and a third cropping area determining section 441. The third cropping area determining section 441 further has a setting reception section 442. Then, each of the first cropping area determining section 437, the second cropping area determining section 439, and the third cropping area determining section 441 calculates four-point coordinates identifying a cropping area in the document image depending on whether the document is in a standard sheet size (e.g., A4 size, A3 size, B5 size, and B4 size) or not.

Each of the first cropping area determining section 437 (a first determination section) and the second cropping area determining section 439 (a first determination section) has coordinate calculation sections 438 and 440. An instruction, whether the document to be read is in a standard sheet size included in information concerning the size stored in the storage section 9 or not, is received from the user. Then, when the received instruction indicates that the document is in a standard sheet size, the coordinate calculation section 438 or 440 calculates four-point coordinates identifying a cropping area in the document image.

On the other hand, the third cropping area determining section 441 (a second determination section) has a coordinate calculation section 443. When an instruction that the document to be read is not in a standard sheet size included in information concerning the size stored in the storage section 9 is received, that is, when an instruction that the document to be read is in a non-standard sheet size is received, the coordinate calculation section 443 calculates four-point coordinates identifying a cropping area in the document image. Further, the third cropping area determining section 441 has a setting reception section 442. The setting reception section 442 receives the setting of the top margin (dx0), the bottom margin (dx1), the left margin (dy0), and the right margin (dy1) from the user. On the basis of the values of dx0, dx1, dy0, and dy1 received by the setting reception section 442, the coordinate calculation section 443 calculates four-point coordinates identifying a cropping area.

On the other hand, the image processing control section 50 controls various kinds of processing performed by the image processing apparatus 4. The image processing control section 50 has an instruction reception section 501 and a cropping area judgment section 502.

During the time of a cropping process, the instruction reception section 501 receives an instruction whether the document is in a standard sheet size or in a non-standard sheet size, from the user. Specifically, information concerning the size of each standard sheet is stored in the storage section 9. Then, the instruction reception section 501 receives an instruction whether the document to be read is in a standard sheet size included in information concerning the size stored in the storage section 9 or not, through the operation panel 10. Further, the instruction reception section 501 receives an instruction of the size of the sheet (referred to as the size of output document, hereinafter) used for outputting the document image, from the user via the operation panel 10.

On the basis of the four-point coordinates calculated by the first cropping area determining section 437 (the coordinate calculation section 438), the second cropping area determining section 439 (the coordinate calculation section 440), or the third cropping area determining section 441 (the coordinate calculation section 443), the cropping area judgment section 502 (a judgment section) judges whether or not the cropping area in the document image is completely contained within given ranges, which are set up in advance. For example, it is judged whether the cropping area determined on the basis of the four-point coordinates calculated by the first cropping area determining section 437, the second cropping area determining section 439, or the third cropping area determining section 441 is completely contained within the maximum reading area allowed to be read by the image input apparatus 3 or not. When the cropping area judgment section 502 judges that the cropping area is not completely contained within the maximum reading area, the first cropping area determining section 437 (the coordinate calculation section 438), the second cropping area determining section 439 (the coordinate calculation section 440), or the third cropping area determining section 441 (the coordinate calculation section 443) changes the four-point coordinates identifying the cropping area to change the cropping area such as to be completely contained within the maximum reading area.

On the basis of the four-point coordinates identifying the cropping area calculated by the document detecting section 43, the document correction section 44 (a cropping section) crops an image corresponding to the cropping area from the read-out document image, and then adopts the cropped image in place of the original document image, as an image to be outputted.

On the basis of the RGB data inputted from the input processing section 42, the segmentation section 49 segments the respective pixels of the inputted image data into a text area, a halftone area, a photograph area (a continuous tone image area), and the like. On the basis of the segmentation result, the segmentation section 49 generates segmentation class data indicating the area to which each pixel belongs, and then outputs the generated segmentation class data to the black generation and under color removal section 46, the spatial filter section 47, and the halftone generation section 48.

The color correction section 45 generates CMY (C: cyan, M: magenta, Y: yellow) data which are complementary color data of the RGB data. Further, in order to improve color reproducibility, the color correction section 45 removes color impurity on the basis of the spectral characteristics of CMY color materials containing useless absorption components. On the other hand, the black generation and under color removal section 46 generates black (K) data from the three-color data of CMY having undergone color correction. Then, the black generation and under color removal section 46 subtracts the generated K data from the original CMY data to generate new CMY data, and then converts the three-color data of CMY into four-color data of CMYK.

The spatial filter section 47 performs spatial filtering by using a digital filter onto the image data of CMYK inputted from the black generation and under color removal section 46 on the basis of the type of area indicated by the segmentation class data inputted from the segmentation section 49. The spatial frequency characteristics of the image data of CMYK is corrected so that blurring and graininess degradation are avoided in the output image outputted by the image output apparatus 5. Further, the halftone generation section 48 performs tone reproduction processing on the image data of CMYK on the basis of the segmentation class data. The image data of CMYK having undergone the tone reproduction processing is outputted to the image output apparatus 5.

The image output apparatus 5 (an image forming section) prints the image based on the image data of CMYK outputted from the image processing apparatus 4, onto a sheet such as a recording paper sheet or an OHP film. The image output apparatus 5 has a photoreceptor, an electrostatic charger, a laser scanning unit, a developing unit, a transfer unit, and the like. The electrostatic charger brings the photoreceptor into an electrostatically charged state at a given potential. The laser scanning unit generates laser light in accordance with image data received from the image processing apparatus 4, and thereby generates an electrostatic latent image on the photoreceptor surface. The developing unit supplies toner onto the electrostatic latent image formed on the photoreceptor surface, and thereby develops the electrostatic latent image. The transfer unit transfers the toner image formed on the photoreceptor surface onto a sheet. The image output apparatus 5 forms an image onto a sheet by electrophotography as an example.

The transmission and reception section 6 has a network card, a modem, or the like for transmitting and receiving image data concerning the image to be displayed on the display section 8, to and from the outside. For example, the transmission and reception section 6 transmits and receives a mail to which an image having undergone a cropping process in the image processing apparatus 4 has been attached, to and from the outside.

For example, the storage section 9 is composed of a nonvolatile semiconductor memory, and stores image data read by the image input apparatus 3 or image data acquired from the outside through the transmission and reception section 6. Further, the storage section 9 stores a size information table that describes information concerning the size of each standard sheet (referred to as size information, hereinafter).

FIG. 7 is a conceptual diagram illustrating the size information table stored in the storage section 9. The storage section 9 stores: the size (the height and the width) of each standard sheet; and the reduced size indicating the number of pixels reduced from this size, that is, the size of the image.

The operation panel 10 has a function button, ten keys, an enter key, an "output" key (or a "copy" key), and the like. The function button is used for switching the function between "facsimile", "copy", "print", "read", and the like, in the digital multi-function peripheral 1. The ten keys are used for receiving the setting of the margins described later. The enter key is used for confirming the received instruction. The "output" key (or the "copy" key) is used for forming, onto a sheet, the document image acquired by the image input apparatus 3 or alternatively the image cropped from the document image by the image processing apparatus 4. Further, by operating the operation panel 10, the user can select a "crop mode" in which a cropping process is performed.

The display section 8 displays: the state of the digital multi-function peripheral 1; the situation of job processing; the image based on the document image data read through the image input apparatus 3; the cropped image having undergone a cropping process in the image processing apparatus 4; a screen for confirming the contents of operating performed through the operation panel 10; and the like. The display section 8 is composed of a liquid crystal display as an example.

The control section 2 has a CPU, a ROM, and a RAM (not illustrated). The ROM stores: various kinds of control programs; coordinates used for judgment of the cropping area judgment section 502 and identifying the maximum reading area; and the like in advance. The RAM stores a plurality of data pieces and the plurality of the stored data pieces are readable regardless of the storage order or the storage location. Further, the RAM temporarily stores: a program read from the ROM; data generated in association with the execution of the program; data received from the outside; and the like. The RAM appropriately provides various kinds of stored data in response to a read instruction from the CPU.

The CPU loads a control program stored in the ROM in advance onto the RAM, and then executes the loaded control program to control the various kinds of hardware described above. By virtue of this, the CPU causes the digital multi-function peripheral 1 to serve as the image forming apparatus according to Embodiment 1.

Figure 8:
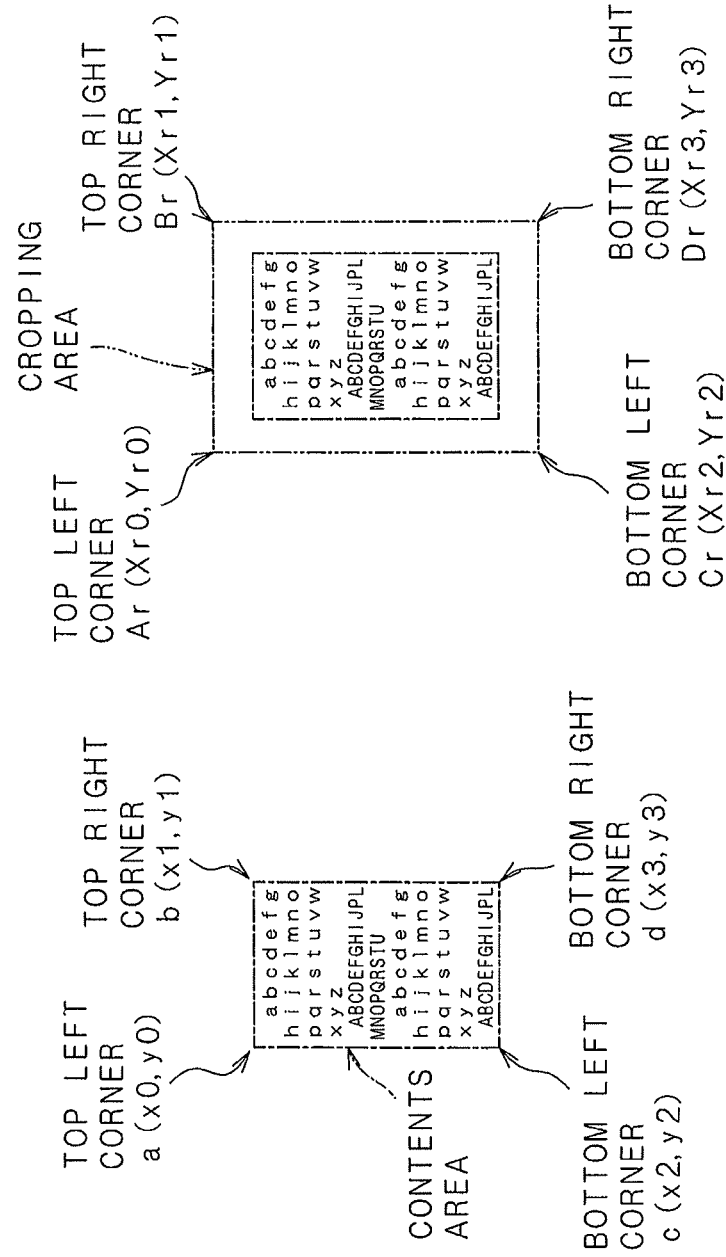
FIG. 8 is an explanatory diagram illustrating the four-point coordinates at the corners of both a contents area and a cropping area.

A cropping process is described below in detail that is performed by the image processing apparatus 4 in the digital multi-function peripheral 1 according to Embodiment 1 of the present invention. For convenience, the following example describes the case where a user selects a crop mode and then instructs printing of a document, that is, the case where four-point coordinates concerning both a contents area and a cropping area are calculated as illustrated in FIG. 8 and then a cropping process is performed by using these four-point coordinates.

Figure 9:
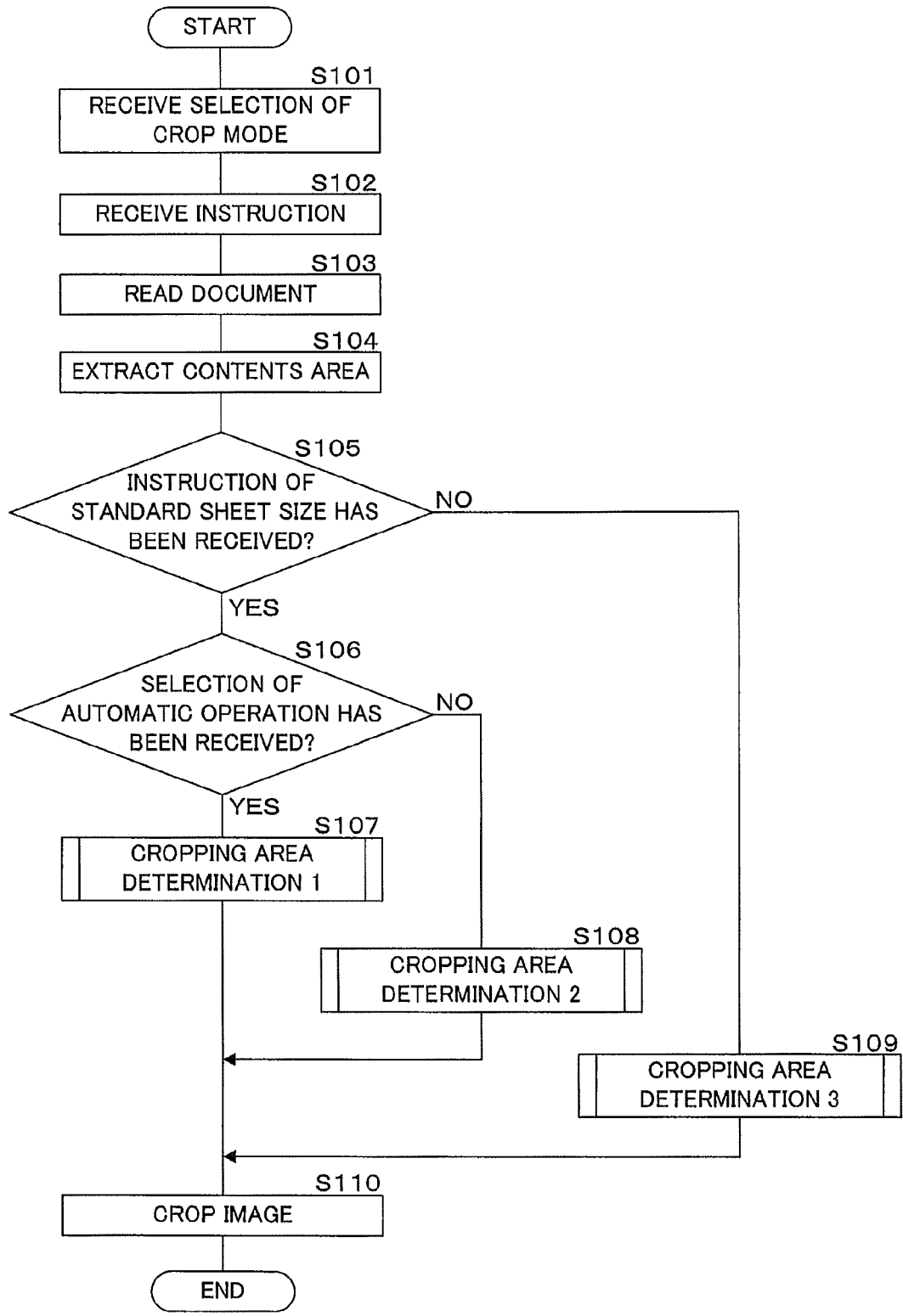
FIG. 9 is a flowchart illustrating a cropping process performed by a digital multi-function peripheral.

FIG. 9 is a flowchart illustrating a cropping process performed by the digital multi-function peripheral 1. FIGS. 10A, 10B, 10C, and 10D are explanatory diagrams illustrating process steps of a cropping process performed by the digital multi-function peripheral 1.

First, a user places a document on the scanner platen of the image input apparatus 3 (refer to FIG. 10A), and then operates the operation panel 10 to instruct reading of the document to the digital multi-function peripheral 1. Then, the CPU of the control section 2 receives the read instruction through the operation panel 10.

Then, the user operates the operation panel 10 to select a crop mode. After that, the CPU of the control section 2 receives the selection of crop mode through the operation panel 10 (step S101).

Then, the user operates the operation panel 10 to perform an instruction concerning a cropping process. Then, the instruction reception section 501 of the image processing control section 50 receives the instruction concerning a cropping process through the operation panel 10 (step S102).

When the user operates the operation panel 10 to causes the digital multi-function peripheral 1 to print the document, the user instructs whether the document is in a standard sheet size or in a non-standard sheet size. Further, when the user instructs that the document is in a standard sheet size, the user selects manual operation or automatic operation. When the user selects manual operation, the user instructs the size (or the type) of output document to be adopted in outputting (or printing) of the document image. Further, when the user instructs that the document is in a non-standard sheet size, the user sets up the margins to be provided in the surroundings of the contents area.

The instruction reception section 501 receives the instruction or the setting described above through the operation panel 10, and then stores data concerning the received instruction or setting into the RAM.

Then, the image input apparatus 3 reads the document placed on the scanner platen (step S103) to acquire a document image (refer to FIG. 10B).

Then, the area extracting section 435 detects the edges of the part containing a text or a graphic in the document image as an example, then calculates the coordinates of each corner on the basis of the detected edges, and extracts a contents area (step S104). The extraction of a contents area performed by the area extracting section 435 is as described above. Thus, the detailed description is omitted (refer to FIG. 10C). As a result of this processing, the coordinates of the four corners of the contents area are acquired as illustrated in FIG. 8.

The RAM stores data concerning the instruction or the setting received through the instruction reception section 501. On the basis of the data concerning the instruction or the setting stored in the RAM, the CPU of the control section 2 judges whether an instruction has been received that the document is in a standard sheet size stored in the storage section 9 or not (step S105).

When the CPU of the control section 2 judges that an instruction is not received that the document is in a standard sheet size stored in the storage section 9 (step S105: NO), the third cropping area determining section 441 of the correction area generation section 436 determines a cropping area (step S109) (refer to FIG. 10D). Then, the processing goes to step S110.

On the other hand, when the CPU of the control section 2 judges that an instruction has been received that the document is in a standard sheet size stored in the storage section 9 (step S105: YES), the CPU of the control section 2 judges whether selection of automatic operation has been received with respect to an instruction of the size (or the type) of output document to be adopted in outputting (or printing) of the document image or not (step S106). This judgment also is performed on the basis of the data concerning the instruction or the setting stored in the RAM.

When the CPU of the control section 2 judges that selection of automatic operation is not received, that is, when the CPU of the control section 2 judges that selection of manual operation has been received (step S106: NO), the second cropping area determining section 439 of the correction area generation section 436 determines a cropping area (step S108) (refer to FIG. 10D). Then, the processing goes to step S110.

Further, when the CPU of the control section 2 judges that selection of automatic operation has been received (step S106: YES), the first cropping area determining section 437 of the correction area generation section 436 determines a cropping area (step S107) (refer to FIG. 10D).

Then, on the basis of the four-point coordinates identifying a cropping area calculated at step S107, S108, or S109, the document correction section 44 crops an image corresponding to the cropping area from the document image read by the image input apparatus 3 (step S110). Then, the document correction section 44 adopts the cropped image in place of the original document image read by the image input apparatus 3, as an image to be outputted.

Figure 11:
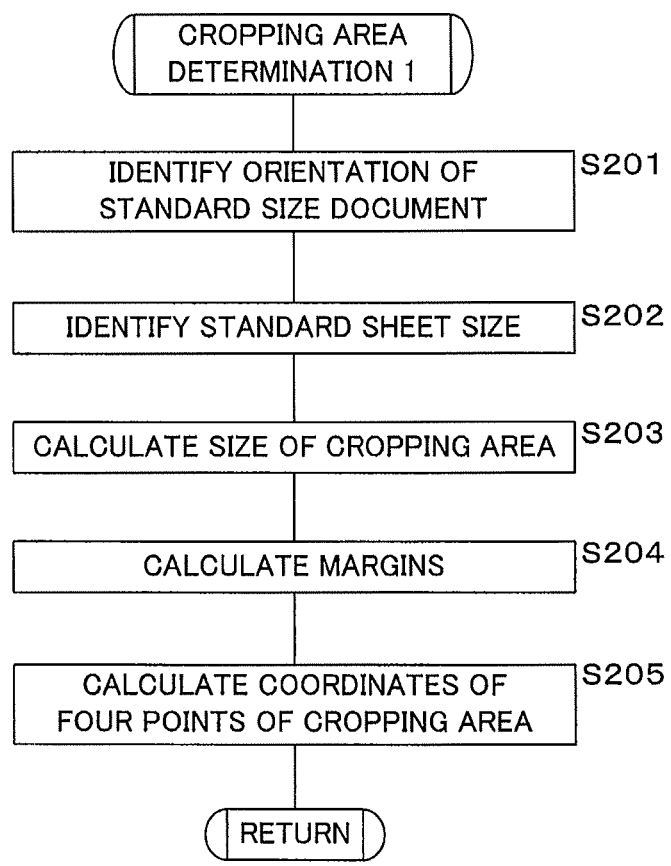
FIG. 11 is a flowchart illustrating processing of cropping area determination performed by a first cropping area determining section.

The processing of cropping area determination is described below that is performed by the first cropping area determining section 437, the second cropping area determining section 439, or the third cropping area determining section 441. FIG. 11 is a flowchart illustrating the processing of cropping area determination performed by the first cropping area determining section 437. FIG. 12 is a flowchart illustrating the processing of cropping area determination performed by the second cropping area determining section 439. FIG. 13 is a flowchart illustrating the processing of cropping area determination performed by the third cropping area determining section 441. For convenience, the following example describes the case where the size of the extracted contents area is as follows.

Size in the main scanning direction (referred to as the main scanning size, hereinafter) COLc: 6601 pixels Size in the sub-scanning direction (referred to as the sub-scanning size, hereinafter) ROWc: 4700 pixels First, the processing of cropping area determination performed by the first cropping area determining section 437 is described below.

At beginning, the first cropping area determining section 437 identifies the orientation of the document of standard sheet size (referred to as the standard size document, hereinafter) (step S201). That is, on the basis of the size of the contents area extracted at step S104, the first cropping area determining section 437 identifies whether the document is placed in an upright orientation or in a sideward orientation.

Specifically, the first cropping area determining section 437 identifies the orientation of the standard size document on the basis of the ratio R of the main scanning size to the sub-scanning size of the contents area (=main scanning size/sub-scanning size) in accordance with the criterion given below.

Ratio $R \geq 1.0$: upright orientation

Ratio $R < 1.0$: sideward orientation

In Embodiment 1, a ratio R=1.40 (=6601/4700) is obtained, and hence an upright orientation of a standard size document is identified.

Then, the first cropping area determining section 437 identifies a standard sheet size corresponding to the standard size document among the standard sheet sizes registered in the size information table stored in the storage section 9 (step S202).

Specifically, on the basis of the orientation of the standard size document identified at step S201, the size of the standard size document is identified in accordance with the criterion given below. Here, the reduced sizes of heights corresponding to the standard sheet sizes A3, B4, A4, B5, and A5 listed in the size information table are denoted by Ha1, Ha2, Ha3, Ha4, and Ha5, respectively. Further, the reduced sizes of widths corresponding to the standard sheet sizes A3, B4, A4, B5, and A5 listed in the size information table are denoted by Wa1, Wa2, Wa3, Wa4, and Wa5, respectively.

When the standard size document is in an upright orientation, the first cropping area determining section 437 searches for sets satisfying main scanning size ∈ reduced size of the height, and sub-scanning size ∈ reduced size of the height among the sets consisting of (Ha1, Wa1), (Ha2, Wa2), (Ha3, Wa3), (Ha4, Wa4), and (Ha5, Wa5). Then, the first cropping area determining section 437 identifies a standard sheet size having the minimum area among the standard sheet sizes corresponding to the identified set, as the standard sheet size corresponding to the standard size document.

When the standard size document is in a sideward orientation, the first cropping area determining section 437 searches for sets satisfying main scanning size ∈ reduced size of the width, and sub-scanning size ∈ reduced size of the height among the sets consisting of (Ha1, Wa1), (Ha2, Wa2), (Ha3, Wa3), (Ha4, Wa4), and (Ha5, Wa5). Then, the first cropping area determining section 437 identifies a standard sheet size having the minimum area among the standard sheet sizes corresponding to the identified set, as the standard sheet size corresponding to the standard size document. In Embodiment 1, the standard size document is identified to be in an upright orientation and of A4 standard sheet size.

On the basis of the size information table stored in the storage section 9, the first cropping area determining section 437 calculates the size of the cropping area (step S203). As a result of the above-mentioned processing, the first cropping area determining section 437 identifies that the standard sheet size corresponding to the standard size document is A4, and thereby adopts the standard sheet size A4 as the size of the cropping area. In Embodiment 1, the size of the cropping area is as follows.

Main scanning size COLf: 7016 pixels

Sub-scanning size ROWf: 4960 pixels

The first cropping area determining section 437 calculates the margins between the contents area and the cropping area (step S204). Specifically, from the size of the contents area and the size of the cropping area, the first cropping area determining section 437 calculates the margins dx0, dx1, dy0, and dy1 illustrated in FIG. 3.

The margins dx0, dx1, dy0, and dy1 are dx0=fix((COLf-COLc)/2), dx1=COLf-COLc-dx0, dy0=fix((ROWf-ROWc)/2), and dy1=ROWf-ROWc-dy0, respectively. Here, the function fix(X) is equal to Gauss' symbol [X] representing the maximum integer not exceeding the value X. For example, when n≤X≤n+1(X: real and n: integer), fix(X)=[X]=n.

In Embodiment 1 of the present invention, dx0=207, dx1=208, dy0=130, and dy1=130.

Then, the coordinate calculation section 438 of the first cropping area determining section 437 calculates the coordinates of the four points at the corners of the cropping area (step S205). These coordinates are calculated on the basis of the margins calculated at step S204 and the four-point coordinates of the contents area obtained at step S104. As such, the coordinate calculation section 438 calculates the coordinates of the four points at the corners of the cropping area (referred to as the four points of the cropping area, hereinafter) to determine the cropping area.

The four-point coordinates of the cropping area are as follows.

Top left corner $Ar$: $(Xr0, Yr0) = (x0-dxA, y0-dyA)$

Top right corner $Br$: $(Xr1, Yr1) = (x1-dxB, y1+dyB)$

Bottom left corner $Cr$: $(Xr2, Yr2) = (x2+dxC, y2-dyC)$

Bottom right corner $Dr$: $(Xr3, Yr3) = (x3+dxD, y3+dyD)$

Here, dxA, dyA, dxB, dyB, dxC, dyC, dxD, and dyD are as follows.

$$dxA = dx0$$

$$dyA = dy0$$

$$dxB = dx0$$

$$dyB = dy1$$

$$dxC = dx1$$

$$dyC = dy0$$

$$dxD = dx1$$

$$dyD = dy1$$

Next, the processing of cropping area determination performed by the second cropping area determining section 439 is described below. The processing of cropping area determination performed by the second cropping area determining section 439 is performed at the time that selection of manual operation is received from the user with respect to an instruction of the size (or the type) of output document to be adopted in outputting (or printing) of the document image and further that an instruction is received that the size (or the type) of output document is stored in the storage section 9. Thus, the processing of cropping area determination performed by the second cropping area determining section 439 is equivalent to that in the above-mentioned processing of cropping area determination performed by the first cropping area determining section 437, the processing of identifying a standard size document at step S202 is omitted. The situation that the size (or the type) of output document is stored in the storage section 9 indicates that the output document is in a standard sheet size.

First, the second cropping area determining section 439 identifies the orientation of the standard size document (step S301). That is, on the basis of the size of the contents area extracted at step S104, the second cropping area determining section 439 identifies whether the document is placed in an upright orientation or in a sideward orientation.

Then, on the basis of the size information table stored in the storage section 9, the second cropping area determining section 439 calculates the size of the cropping area (step S302). Here, since an instruction of a standard sheet size to be used in the output document has already been received from the user, the standard sheet size according to the received instruction is adopted as the size of the cropping area.

Then, the second cropping area determining section 439 calculates the margins between the contents area and the cropping area (step S303). Specifically, from the size of both the contents area and the cropping area, the second cropping area determining section 439 calculates the margins dx0, dx1, dy0, and dy1 illustrated in FIG. 3.

Then, the coordinate calculation section 440 of the second cropping area determining section 439 calculates the coordinates of the four points of the cropping area (step S304). These coordinates are calculated on the basis of the margins calculated at step S304 and the four-point coordinates of the contents area obtained at step S104. As such, the coordinate calculation section 440 calculates the coordinates of the four points of the cropping area to determine the cropping area.

Next, the processing of cropping area determination performed by the third cropping area determining section 441 is described below. The processing of cropping area determination performed by the third cropping area determining section 441 is performed when the document is in a non-standard sheet size.

First, the third cropping area determining section 441 receives setting of the margins between the contents area and the cropping area in the vertical and horizontal directions from the user (step S401). For example, the user operates the operation panel 10 to input the margins by the unit of inch for all of the vertical and horizontal directions. Then, the third cropping area determining section 441 receives the setting of the margins through the operation panel 10.

In a case that margins of Mx0, Mx1, My0, and My1 inches respectively in the vertical and horizontal directions are to be generated in an image scanned with a resolution of ResIn, the margins dx0, dx1, dy0, and dy1 are as follows.

$$dx0 = Mx0 \times \text{ResIn}$$

$$dx1 = Mx1 \times \text{ResIn}$$

$$dy0 = My0 \times \text{ResIn}$$

$$dy1 = My1 \times \text{ResIn}$$

For example, when the third cropping area determining section 441 receives setting of the margins of 0.5 inch in all of the vertical and horizontal directions, Mx0, Mx1, My0, and My1 are all 0.5 from the user.

Then, the coordinate calculation section 443 of the third cropping area determining section 441 calculates the coordinates of the four points of the cropping area (step S402). These coordinates are calculated on the basis of the margins calculated at step S401 and the four-point coordinates of the contents area obtained at step S104.

As such, even when the document is in a non-standard sheet size, calculation of the coordinates of the four points of the cropping area is achieved. When the document is in a non-standard sheet size, the size of the cropping area does not have a standard size. Thus, the cropping area is determined as a non-standard sheet size obtained by adding the given margins to the size of the contents area.

Then, the third cropping area determining section 441 adds the size of the cropping area based on the coordinates of the four points of the cropping area calculated at step S402, into the size information table of the storage section 9 to update the size information table (step S403).

FIG. 14 is an illustrative diagram describing update of the size information table stored in the storage section 9 of the digital multi-function peripheral 1. In the size information table, an entry "non-standard sheet size 1" is added, which describes the size (the height and the width) of the newly obtained cropping area and the reduced size obtained by reducing the actual size into the number of pixels. As such, the size information table is updated.

As described above, as a result of the processing performed by the first cropping area determining section 437, the second cropping area determining section 439, and the third cropping area determining section 441, the coordinates of the four corners of the cropping area are obtained so that the cropping area is determined as illustrated in FIG. 8.

In the description given above, setting of the margins between the contents area and the cropping area has been received from the user. However, employable methods of setting the margins are not limited to this. That is, the margins may be constant values defined in advance. It should be noted that in a case where setting of the margins is to be received from a user, mutually different margins may be instructed respectively in the vertical and horizontal directions by the user.

Further, in the description given above, in a case where the document is in a non-standard sheet size, the third cropping area determining section 441 has automatically updated the size information table in the processing of cropping area determination. However, employable methods of updating the size information table are not limited to this.

For example, when processing of cropping area determination has been performed on a document of non-standard sheet size (referred to as a non-standard size document, hereinafter), the third cropping area determining section 441 may compare the size of the determined the cropping area with the standard sheet sizes already registered in the size information table of the storage section 9, and then update the size information table on the basis of the comparison result.

Specifically, when the document is in a non-standard sheet size, the third cropping area determining section 441 determines the cropping area of the non-standard size document as described above and then calculates the area of the cropping area. Then, the third cropping area determining section 441 calculates the area of each standard sheet size already registered in the size information table, and then compares the calculated area with the area of the cropping area. For example, the third cropping area determining section 441 calculates the ratio of the area of each standard sheet size to the area of the cropping area of the non-standard size document. Then, when the calculated ratio falls outside of a given range (e.g., 0.95 to 1.05), the third cropping area determining section 441 adds the size of the cropping area of the non-standard size document into the size information table to update the size information table.

Here, before adding the size of the cropping area of the non-standard size document into the size information table to update the size information table, the third cropping area determining section 441 may receive selection of whether the size information table is to be updated or not, from the user. Specifically, when the ratio of the area of each standard sheet size to the area of the cropping area of the non-standard size document falls outside the given range, a screen used for receiving an instruction whether the size information table is to be updated or not is displayed to the user. Then, when an instruction indicating that the size information table is to be updated is received from the user, the third cropping area determining section 441 update the size information table.

For example, when a non-standard size document such as a name card is to be read (printed) in the crop mode, since the size information table illustrated in FIG. 6 does not have an entry of standard sheet size corresponding to a name card, the third cropping area determining section 441 will add the size of a cropping area of name card size into the size information table. Thus, in a case of name card printing after that, the user at step S102 in FIG. 9 can instruct that the document is a standard sheet size stored in the storage section 9 and then select automatic operation for an instruction of the size (or the type) of output document to be adopted in outputting (or printing) of the document image. Even the user can print such a non-standard size document (a name card) appropriately.

FIGS. 15A and 15B are explanatory diagrams illustrating the result of a cropping process performed by the digital multi-function peripheral 1. As a result of the processing described above, a cropping process of a cropping area is performed on the document image read by the image input apparatus 3. That is, a cropping area is cropped from the document image in the cropping process, and then an image corresponding to the cropping area is adopted as an output document image.

Here, such a configuration may be employed that when the crop mode is not selected, the processing to be performed by the document detecting section 43 and the document correction section 44 is omitted. Further, the document detecting section 43 may detect the skew and the orientation direction of the document, and then the document correction section 44 may correct the skew and the orientation direction of the document image as described later.

When the user places a document on the scanner platen of the image input apparatus 3, the document is obliquely placed in some cases. In the image forming apparatus according to the present invention, a cropping area is calculated appropriately even for a document placed obliquely (referred to as an obliquely placed document, hereinafter).

The processing is described below that is performed on an obliquely placed document by the digital multi-function peripheral 1 according to Embodiment 1 of the present invention.

Figure 17:
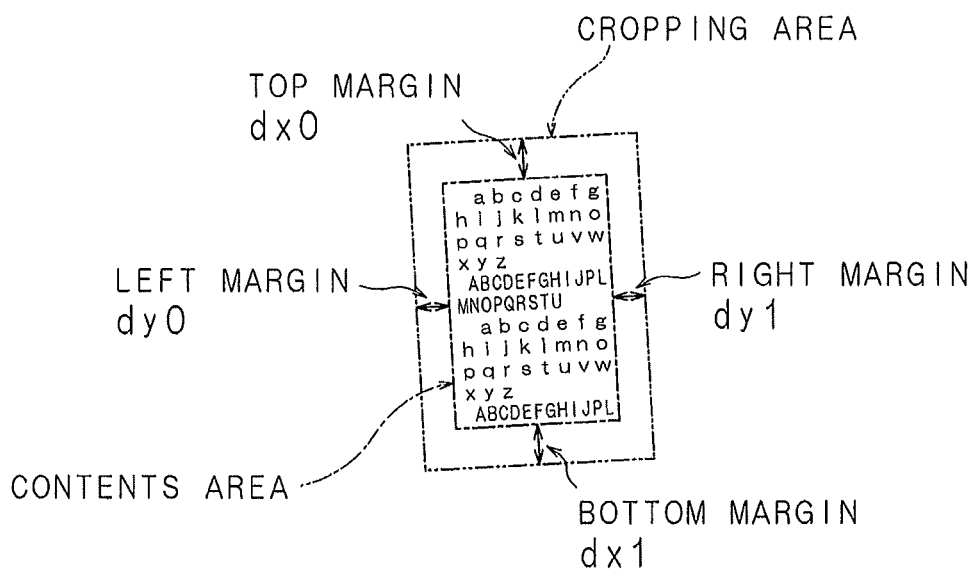
FIG. 17 is an explanatory diagram illustrating processing performed on an obliquely placed document by a digital multi-function peripheral.
Figure 19A:
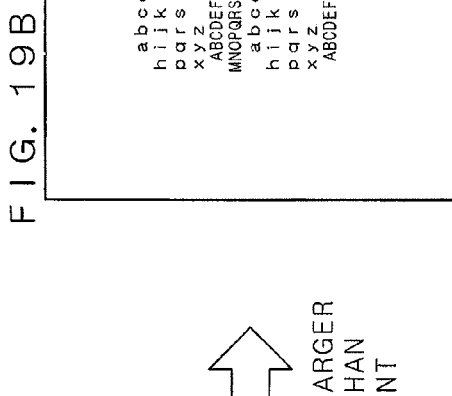
FIGS. 19A, 19B, 19C, and 19D are explanatory diagrams illustrating a method of cropping area determination in a document feed mode in a digital multi-function peripheral.
Figure 19B:
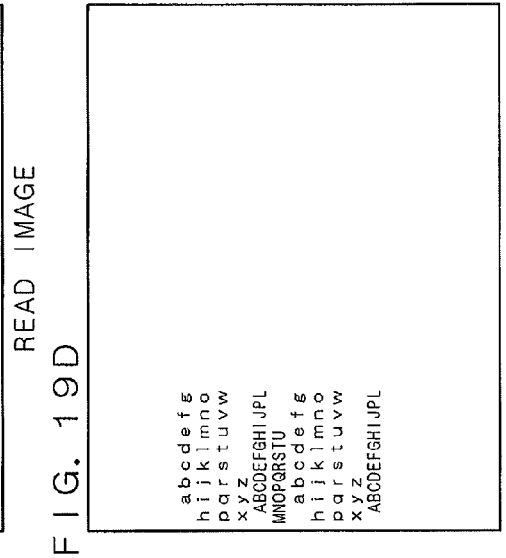
Figure 19C:
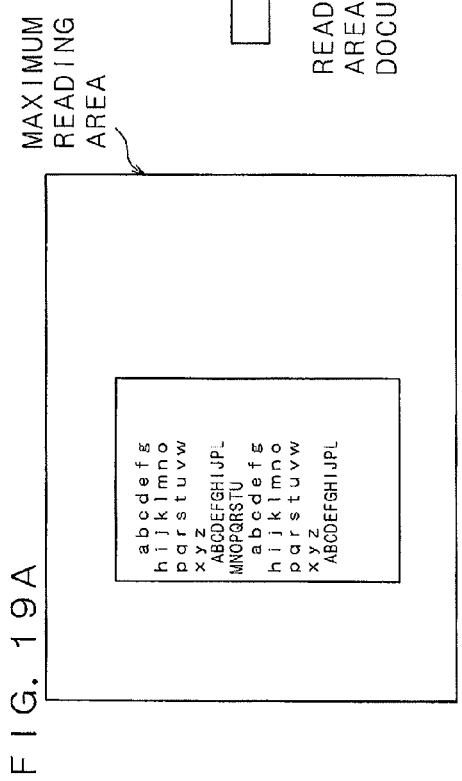
Figure 19D:
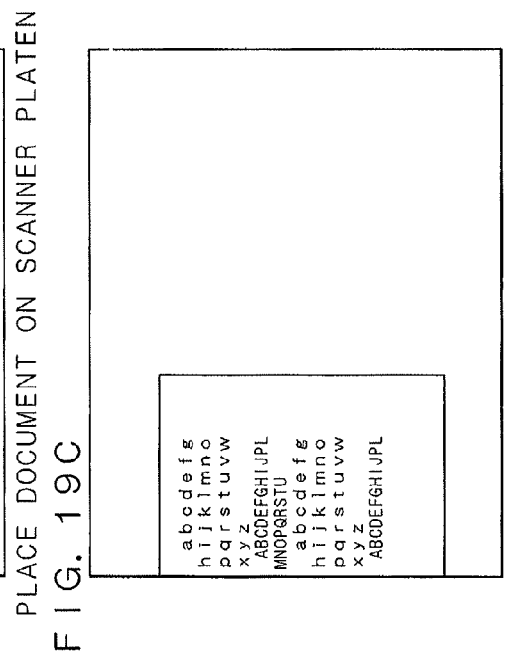

FIGS. 16A, 16B, 16C, and 16D are explanatory diagrams illustrating calculation of a cropping area performed on an obliquely placed document by the digital multi-function peripheral 1. FIG. 17 is an explanatory diagram illustrating processing performed on an obliquely placed document by the digital multi-function peripheral 1.

When a document is placed obliquely on the scanner platen, a cropping area is determined with consideration of the skew angle. For convenience, the following example describes the case where an instruction that the obliquely placed document is in a standard sheet size stored in the storage section 9 and selection of automatic operation for an instruction of the size (or the type) of output document to be adopted in outputting (or printing) of the document image are received from the user. In other words, the following example describes the case where the first cropping area determining section 437 performs the processing of cropping area determination.

First, as described above, the first cropping area determining section 437 performs the processing at steps S201 to S204 to calculate the margins between the contents area and the cropping area. On the basis of the margins calculated at step S204 and the skew angle ($\theta$) calculated by the skew detecting section 434, the coordinate calculation section 438 of the first cropping area determining section 437 calculates the four-point coordinates of the cropping area. The four-point coordinates of the cropping area are as follows.

Top left corner $Ar$: $(Xr0,Yr0)=(x0-dxA,y0-dyA)$

Top right corner $Br$: $(Xr1,Yr1)=(x1-dxB,y1+dyB)$

Bottom left corner $Cr$: $(Xr2,Yr2)=(x2+dxC,y2-dyC)$

Bottom right corner $Dr$: $(Xr3,Yr3)=(x3+dxD,y3+dyD)$

Here, dxA, dyA, dxB, dyB, dxC, dyC, dxD, and dyD are as follows.

$dxA=\text{fix}(\cos\theta \times dx0-\sin\theta \times dy0)$ $dyA=\text{fix}(\sin\theta \times dx0+\cos\theta \times dy0)$ $dxB=\text{fix}(\cos\theta \times dx0+\sin\theta \times dy1)$ $dyB=\text{fix}(-\sin\theta \times dx0+\cos\theta \times dy1)$ $dxC=\text{fix}(\cos\theta \times dx1+\sin\theta \times dy0)$ $dyC=\text{fix}(-\sin\theta \times dx1+\cos\theta \times dy0)$ $dxD=\text{fix}(\cos\theta \times dx1-\sin\theta \times dy1)$ $dyD=\text{fix}(\sin\theta \times dx1+\cos\theta \times dy1)$ For example, when the image input apparatus 3 reads a document that contains a text or a graphic in the upper end part and that is placed at a corner on the far side of the scanner platen, a possibility arises that the cropping area concerning the document is not completely contained within given ranges (e.g., the maximum reading area). In this case, the image forming apparatus according to the present invention changes the cropping area (specifically, the coordinates of the four points) to be completely contained within the given ranges.

The processing of changing the cropping area is described below that is performed by the digital multi-function peripheral 1 according to Embodiment 1 of the present invention when the determined cropping area is not completely contained within given ranges.

FIGS. 18A, 18B, 18C, and 18D are explanatory diagrams illustrating processing of changing a cropping area performed by the digital multi-function peripheral 1. For convenience, the following example describes the case where an instruction that the document is in a standard sheet size stored in the storage section 9 and selection of automatic operation for an instruction of the size (or the type) of output document to be adopted in outputting (or printing) of the document image are received from the user and then the first cropping area determining section 437 performs the processing of cropping area determination.

First, as described above, the first cropping area determining section 437 performs the processing at steps S201 to S205 to calculate the four-point coordinates of the cropping area. Then, the cropping area judgment section 502 of the image processing control section 50 compares the coordinates concerning the maximum reading area already stored in the ROM with the four-point coordinates of the cropping area calculated by the first cropping area determining section 437, and judges whether the cropping area is completely contained within the maximum reading area or not.

When the cropping area judgment section 502 judges that the cropping area is not completely contained within the maximum reading area, the coordinate calculation section 438 of the first cropping area determining section 437 changes the cropping area such that the cropping area should be completely contained within the maximum reading area. Specifically, the first cropping area determining section 437 calculates the amounts of overrun of the cropping area from the maximum reading area, and then changes the coordinates of the four points of the cropping area.

For example, when the upper side and the left side of the calculated cropping area runs outside the maximum reading area, the four-point coordinates of the changed cropping area are calculated as follows. Here, the amounts of overrun on the upper side and on the left side are denoted by dx0_out and dy0_out, respectively.

Top left corner $Ar$: $(Xr0,Yr0)=(Xr0+dx0\_out,Yr0+dy0\_out)$

Top right corner $Br$: $(Xr1,Yr1)=(Xr1+dx0\_out,Yr1+dy0\_out)$

Bottom left corner $Cr$: $(Xr2,Yr2)=(Xr2+dx0\_out,Yr2+dy0\_out)$

Bottom right corner $Dr$: $(Xr3,Yr3)=(Xr3+dx0\_out,Yr3+dy0\_out)$

Further, in the digital multi-function peripheral 1 according to Embodiment 1 of the present invention, the cropping area is determined depending on the mode of document read. The modes of document read include: a document feed mode in which documents are set on an automatic document feeder and then the documents having been set are automatically fed and read; and a static document mode in which a document is placed on the scanner platen and then the placed document is read in a static state. Different methods of determining a cropping area are employed depending on whether the mode of document read is the document feed mode or the static document mode or not.

Specifically, in the document feed mode, the cropping area judgment section 502 of the image processing control section 50 compares the coordinates of the four points of the cropping area obtained by the method described above with the coordinates concerning the maximum reading area, and judges whether the cropping area is completely contained within the maximum reading area or not. Then, when the cropping area judgment section 502 judges that the cropping area is not completely contained within the maximum reading area, the first cropping area determining section 437, the second cropping area determining section 439, or the third cropping area determining section 441 changes the cropping area such that the cropping area should be completely contained within the maximum reading area. Whether the document feed mode is selected or not is judged on the basis of output from a document detection sensor provided in the automatic document feeder. The other processing is as described above, and hence detailed description is omitted.

As illustrated in FIGS. 19A, 19B, 19C, and 19D, in a case where the document is read in an automatically fed manner by using the automatic document feeder, the document is read in a state of being deviated toward a given position (leftward in the figure) in the maximum reading area.

Figure 20:
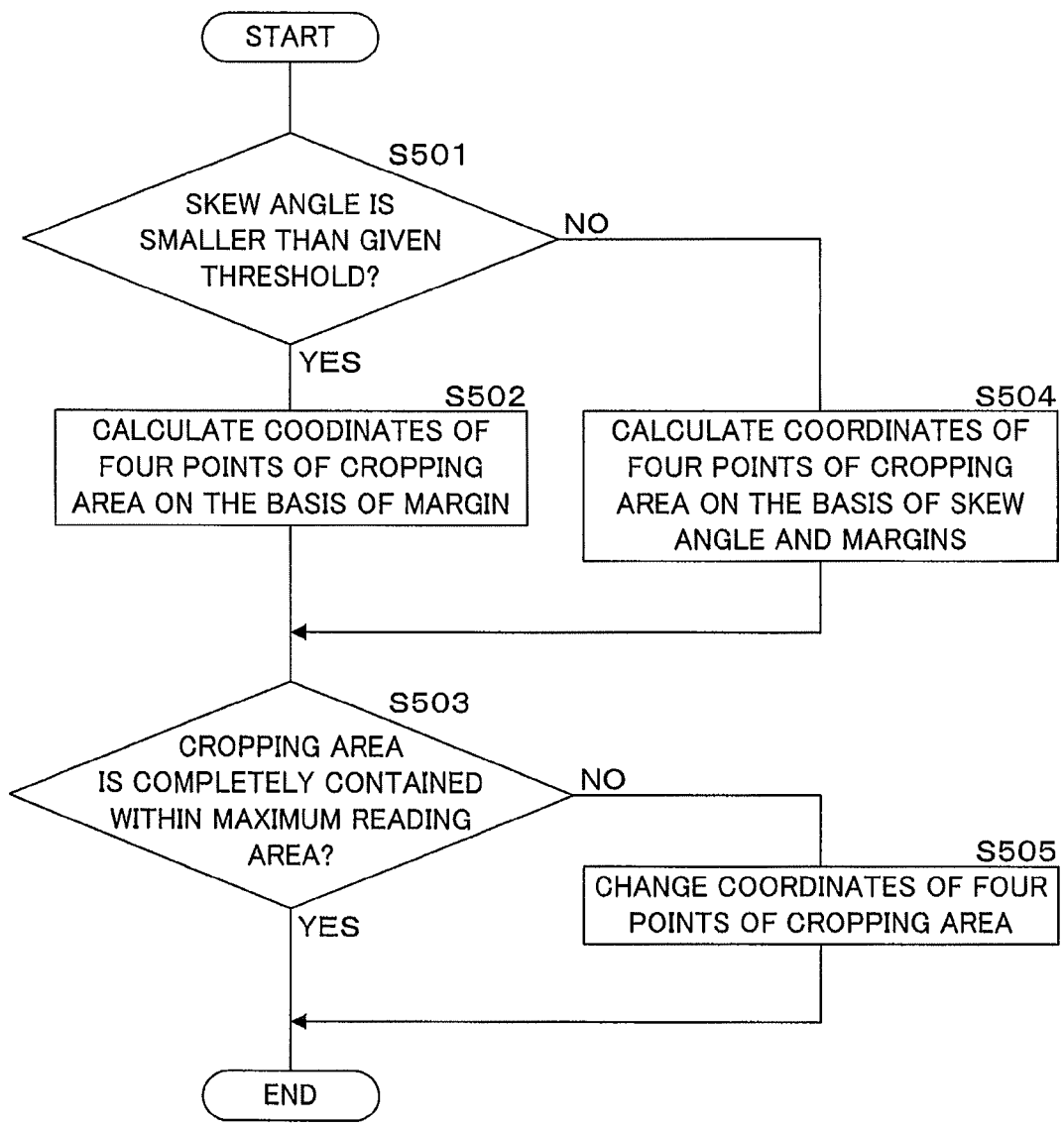
FIG. 20 is a flowchart illustrating an example of a method of calculating coordinates of the four points of a cropping area performed by a digital multi-function peripheral.

FIG. 20 is a flowchart illustrating an example of a method of calculating coordinates of the four points of a cropping area performed by the digital multi-function peripheral 1. For convenience, the following example describes the case where an instruction that the document is in a standard sheet size stored in the storage section 9 and selection of automatic operation for an instruction of the size (or the type) of output document to be adopted in outputting (or printing) of the document image are received from the user and then the coordinate calculation section 438 of the first cropping area determining section 437 calculates the coordinates of the four points of the cropping area.

First, on the basis of the detection result obtained by the skew detecting section 434, the coordinate calculation section 438 judges whether the skew angle ($\theta$) of the document image (or document) is smaller than a given threshold or not (step S501).

When the coordinate calculation section 438 judges that the skew angle ($\theta$) is not smaller than the given threshold (step S501: NO), the coordinate calculation section 438 calculates the coordinates of the four points of the cropping area on the basis of the skew angle ($\theta$) calculated by the skew detecting section 434 and the margins calculated at step S204 (step S504). Here, the method of calculating these coordinates of the four points has been described above, and hence detailed description is omitted.

On the other hand, when the coordinate calculation section 438 judges that the skew angle ($\theta$) is smaller than the given threshold (step S501: YES), the coordinate calculation section 438 calculates the coordinates of the four points of the cropping area only on the basis of the margins between the contents area and the cropping area (step S502).

Then, the cropping area judgment section 502 compares the four-point coordinates of the cropping area calculated at step S502 or S504 by the coordinate calculation section 438 with the coordinates concerning the maximum reading area stored in the ROM and judges whether the cropping area is completely contained within the maximum reading area or not (step S503).

When the cropping area judgment section 502 judges that the cropping area is not completely contained within the maximum reading area (step S503: NO), the coordinate calculation section 438 changes the coordinates of the four points of the cropping area such that the cropping area should be completely contained within the maximum reading area (step S505). Here, the method of updating the coordinates of the four points of the cropping area has been described above, and hence detailed description is omitted.

On the other hand, when the cropping area judgment section 502 judges that the cropping area is completely contained within the maximum reading area (step S503: YES), the processing is terminated.

Embodiment 2

The image reading apparatus according to the present invention is described below in detail with reference to the drawings for an example of application in a scanner.

Figure 21:
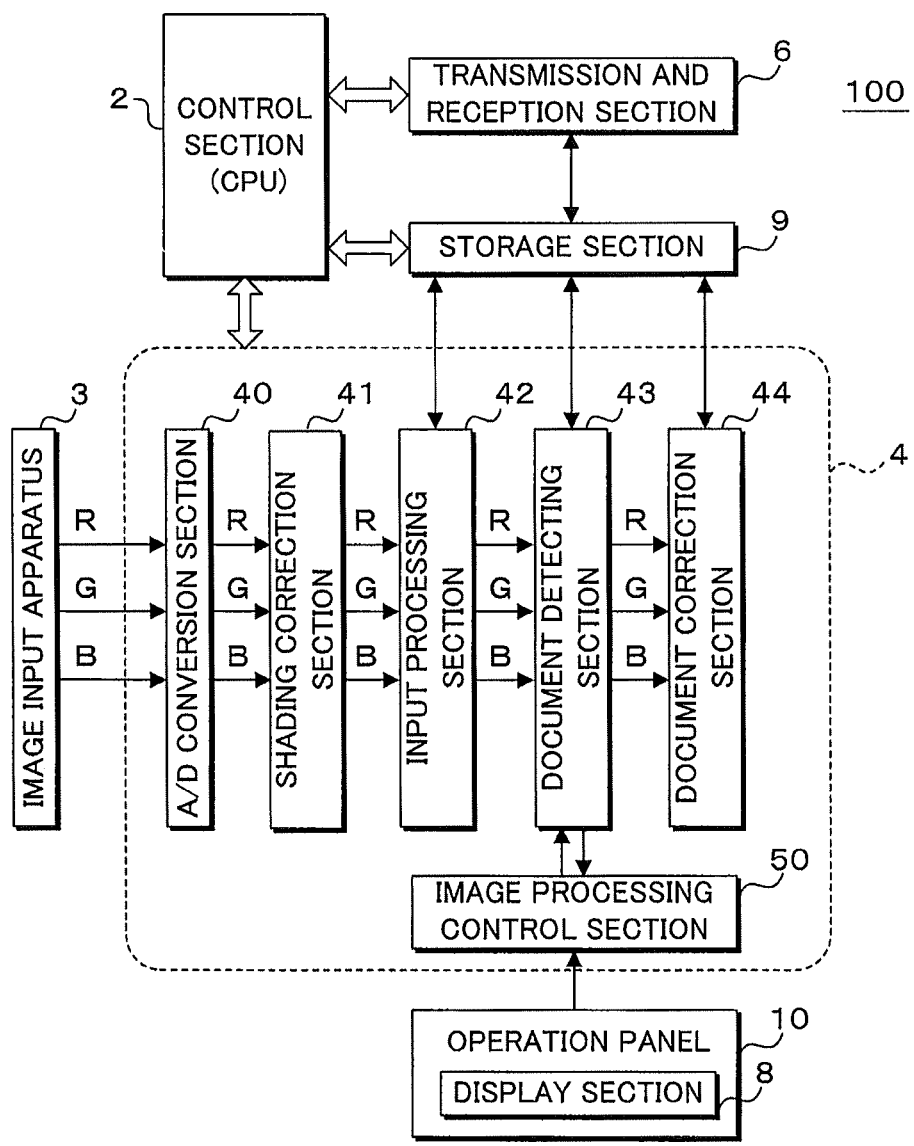
FIG. 21 is a block diagram illustrating a main part configuration of a scanner according to Embodiment 2 of the present invention.

FIG. 21 is a block diagram illustrating a main part configuration of a scanner 100 according to Embodiment 2 of the present invention. The scanner 100 has a control section 2, an image input apparatus 3, an image processing apparatus 4, a transmission and reception section 6, a storage section 9 and an operation panel 10. Further, the operation panel 10 has a display section 8.

Further, the image processing apparatus 4 has an A/D (analog/digital) conversion section 40, a shading correction section 41, an input processing section 42, a document detecting section 43, a document correction section 44, and an image processing control section 50. The image processing apparatus 4 is connected to an output apparatus (not illustrated). The image processing apparatus 4 acquires a document image, for example, through the image input apparatus 3. Then, similarly to Embodiment 1, the image processing apparatus 4 performs a cropping process on the acquired document image and then outputs (e.g., prints) the cropped document image through the output apparatus.

The configuration according to Embodiment 2 is approximately the same as that of Embodiment 1. Identical parts to those in Embodiment 1 are designated by identical numerals, and hence their detailed description is omitted.

Embodiment 3

The image processing apparatus according to the present invention below is described below in detail with reference to the drawings.

Figure 22:
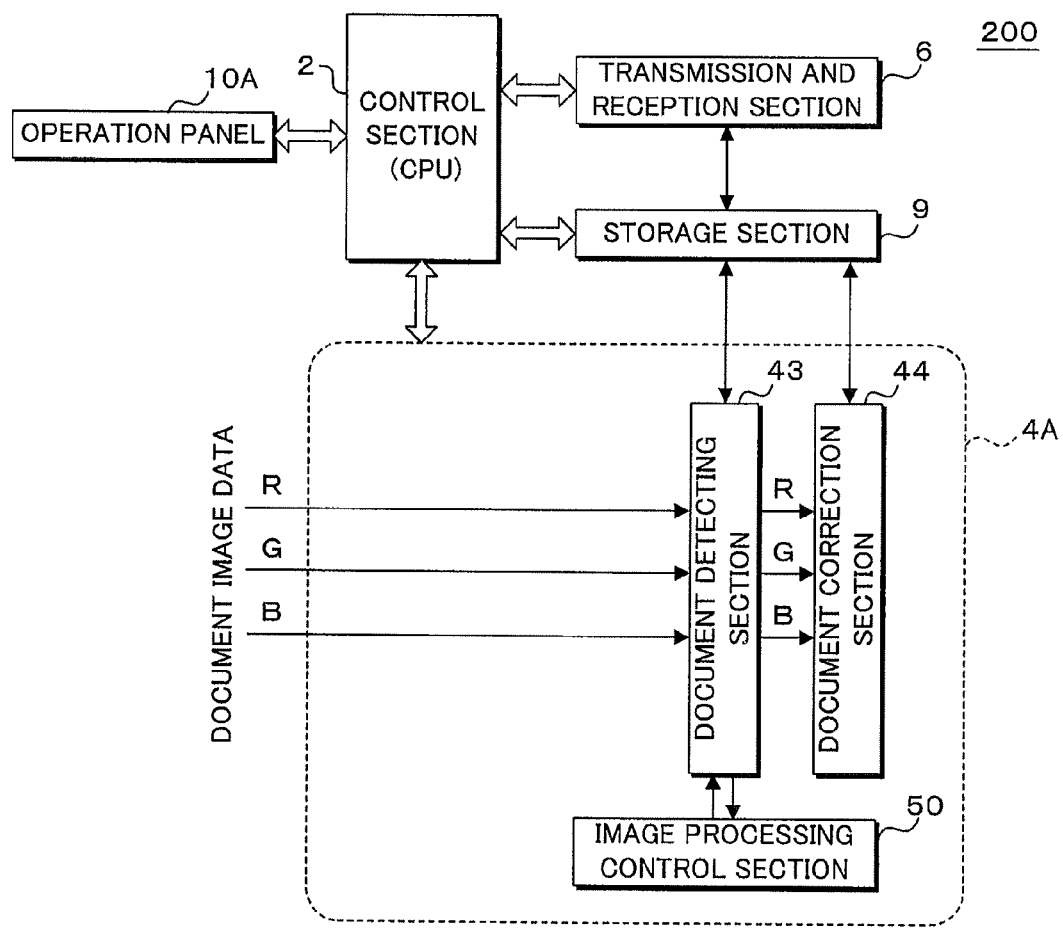
FIG. 22 is a block diagram illustrating a main part configuration of an image processing apparatus according to Embodiment 3 of the present invention.

FIG. 22 is a block diagram illustrating a main part configuration of an image processing apparatus 200 according to Embodiment 3 of the present invention. The image processing apparatus 200 has a control section 2, an image processing section 4A, a transmission and reception section 6, a storage section 9, and an operation panel 10A.

Further, the image processing section 4A has a document detecting section 43, a document correction section 44, and an image processing control section 50. The image processing apparatus 4A is connected to an output apparatus (not illustrated). The image processing section 4A acquires a document image, for example, from the storage section 9 or through the transmission and reception section 6. Then, similarly to Embodiments 1 and 2, the image processing apparatus 4A performs a cropping process on the acquired document image and then outputs (e.g., prints) the cropped document image through the output apparatus.

At this time, the image processing apparatus 200 receives, from the user through the operation panel 10A, an instruction whether the document to be processed is in a standard sheet size or in a non-standard sheet size and an instruction of the size of output document used in outputting through the external output apparatus.

Identical parts to those in Embodiment 1 are designated by identical numerals, and hence their detailed description is omitted.

Embodiment 4

Figure 23:
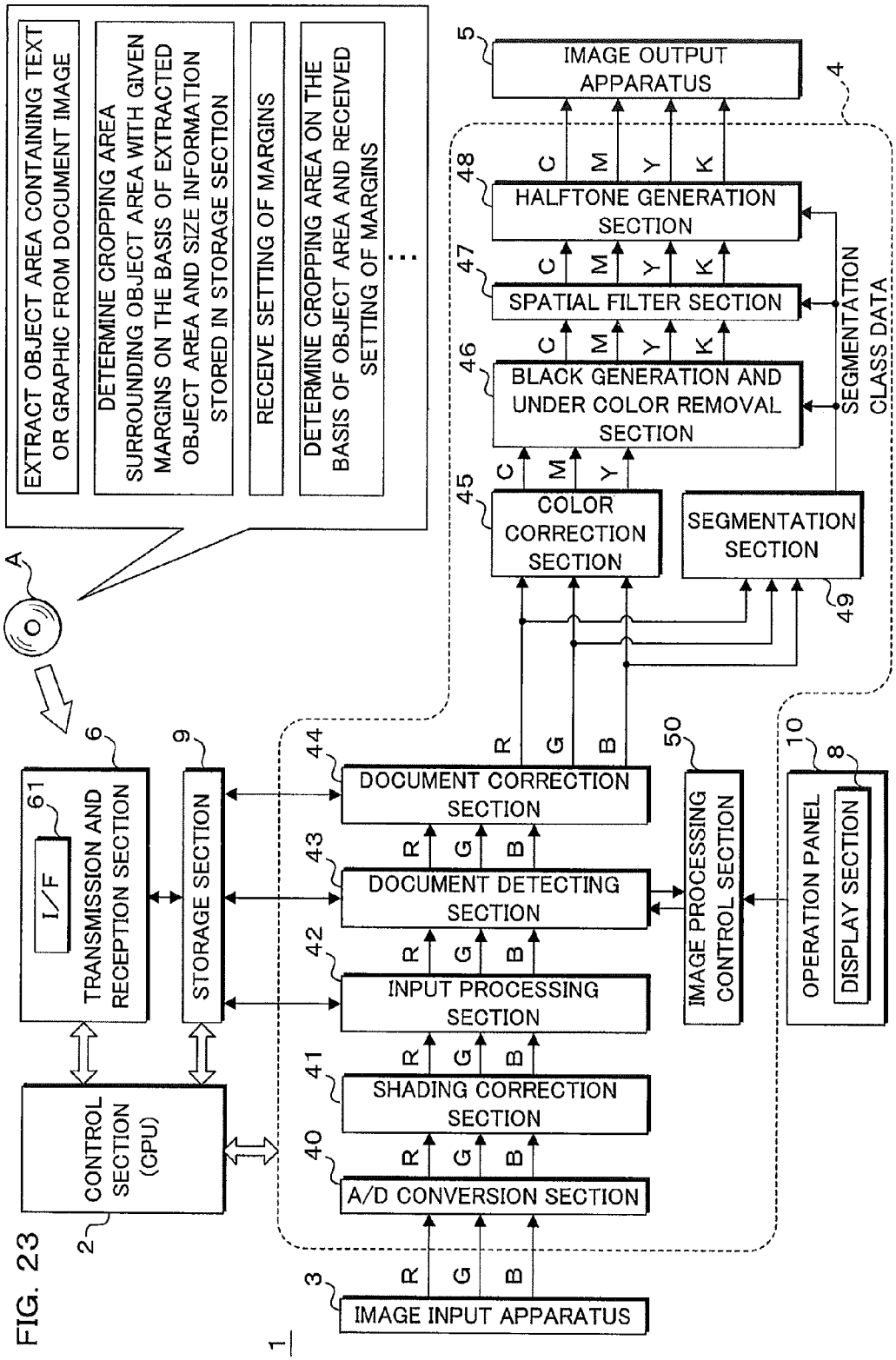
FIG. 23 is a functional block diagram illustrating a main part configuration of a digital multi-function peripheral according to Embodiment 4 of the present invention.

FIG. 23 is a functional block diagram illustrating a main part configuration of a digital multi-function peripheral 1 according to Embodiment 4 of the present invention. In the digital multi-function peripheral 1 according to Embodiment 3, a computer program used for operation is readable from a recording medium such as a CD-ROM through an I/F 61. Further, in the digital multi-function peripheral 1 according to Embodiment 4, the computer program is downloadable from an external device (not illustrated) through the transmission and reception section 6. These situations are described below.

The digital multi-function peripheral 1 according to Embodiment 4 has an external (or internal) recording medium reader (not illustrated). In the digital multi-function peripheral 1 according to Embodiment 4, a portable recording medium A storing the program is inserted into the recording medium reader and then, for example, the CPU of the control section 2 installs this program on the ROM (not illustrated) or the storage section 9. The portable recording medium A stores, for example, a program causing the digital multi-function peripheral 1 to: extract an object area containing a text or a graphic from a document image; determine a cropping area surrounding the object area with given margins on the basis of the extracted object area and the size information stored in the storage section 9; receive setting of the margins; determine a cropping area on the basis of the object area and the received setting of the margins; receive an instruction whether the size of the document image is stored as size information in the storage section or not; and determine a cropping area on the basis of the received instruction The installed program is loaded onto a RAM (not illustrated) and then executed by the CPU of the control section 2. As a result, the digital multi-function peripheral 1 in Embodiment 4 serves as the digital multi-function peripheral 1 in Embodiment 1.

The recording medium A may be a so-called program medium, and may be a medium of tape type, disk type, or card type as well as a semiconductor memory or the like that store a program code in a fixed manner. The medium of tape type is a magnetic tape, a cassette tape, or the like. The medium of disk type is a magnetic disk, an optical disk, or the like. The magnetic disk is a flexible disk, a hard disk, or the like. The optical disk is a CD-ROM, an MO, an MD, a DVD, or the like. The medium of card type is an IC card (including a memory card), an optical card, or the like. The semiconductor memory is a mask ROM, an EPROM, an EEPROM, a flash ROM, or the like.

The recording medium A may be a medium dynamically storing a program code such that the program code is downloaded from a network through the transmission and reception section 6. Here, when the program is to be downloaded through a communication network as described here, a program for download may be stored in advance in the main apparatus or alternatively may be installed from another recording medium. Here, the present invention may be implemented in the form of a computer data signal in which the program code is implemented by electronic transmission and the implemented program code is embedded in carrier waves.

Identical parts to those in Embodiment 1 are designated by identical numerals, and hence detailed description is omitted.

Figure 24:
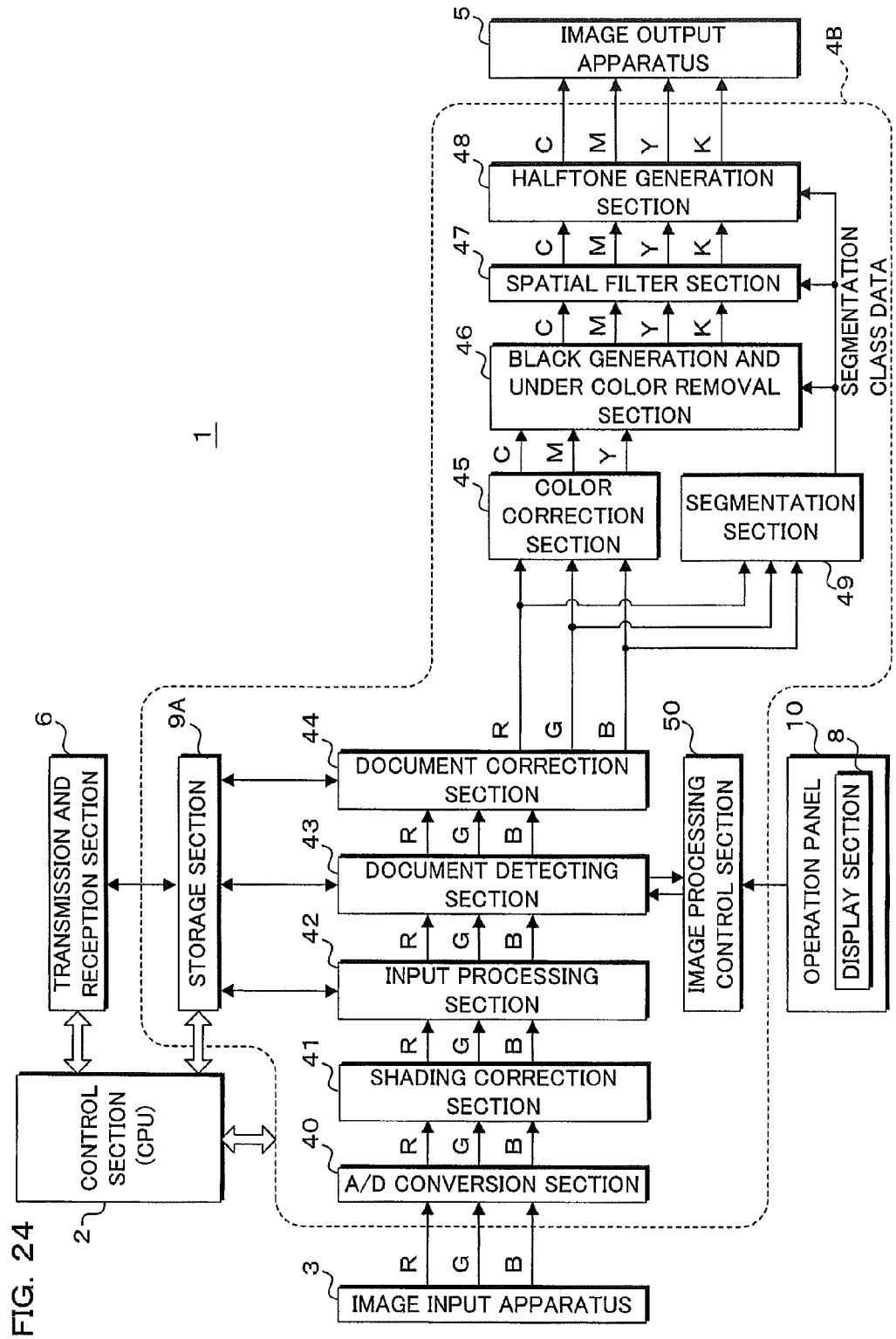
FIG. 24 is a block diagram illustrating a main part configuration of a digital multi-function peripheral according to a variation of Embodiment 1 of the present invention.

A variation of Embodiment 1 is described. FIG. 24 is a block diagram illustrating a main part configuration of a digital multi-function peripheral according to a variation of Embodiment 1 of the present invention. Identical parts to those in Embodiment 1 are designated by identical numerals, and hence detailed description is omitted.

In above-mentioned Embodiment 1, the image processing apparatus 4 calculates the size of the cropping area on the basis of the size information table stored in the storage section 9 located outside. On the other hand, in the variation, an image processing apparatus 4B further has a storage section 9A having same function as the storage section 9 and calculates a size of a cropping area on the basis of size information table stored in the storage section 9A.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus performing a cropping process on a document image containing a text or a graphic, comprising:
   an extraction section extracting an object area containing the text or the graphic from the document image;
   an instruction reception section receiving an instruction whether a size of the document image is one of pre-stored standard sheet sizes or not;
   a first determination section determining a cropping area surrounding the object area with given margins on the basis of the object area extracted by the extraction section and the standard sheet sizes when the instruction reception section receives an instruction that the size of the document image is one of the standard sheet sizes;
   a setting reception section receiving setting of the margins;
   a second determination section determining the cropping area on the basis of the object area extracted by the extraction section and the setting of the margins received by the setting reception section when the instruction reception section receives an instruction that the size of the document image is a non-standard sheet size which is not one of the standard sheet sizes;
   a cropping section cropping the cropping area determined by the first determination section or the second determination section from the document image;
   a coordinate calculation section calculating coordinates identifying the cropping area; and
   a judgment section judging whether the cropping area is completely contained within given coordinate ranges or not, on the basis of the calculation result obtained by the coordinate calculation section,
   wherein when the judgment section judges that the cropping area is not completely contained within the coordinate ranges, the first determination section or the second determination section changes the cropping area such as to be completely contained within the coordinate ranges.

2. The image processing apparatus according to claim 1, wherein the cropping area size determined by the second determination section is stored as one of the standard sheet sizes.

3. An image forming apparatus comprising:
an image processing apparatus performing a cropping process on a document image containing a text or a graphic image; and
an image forming section forming an image corresponding to the cropping area obtained by the cropping process performed by the image processing apparatus onto a sheet-like recording medium,
wherein the image processing apparatus includes:
an extraction section extracting an object area containing the text or the graphic from the document image;
an instruction reception section receiving an instruction whether a size of the document image is one of pre-stored standard sheet sizes or not;
a first determination section determining a cropping area surrounding the object area with given margins on the basis of the object area extracted by the extraction section and the standard sheet sizes when the instruction reception section receives an instruction that the size of the document image is one of the standard sheet sizes;
a setting reception section receiving setting of the margins;
a second determination section determining the cropping area on the basis of the object area extracted by the extraction section and the setting of the margins received by the setting reception section when the instruction reception section receives an instruction that the size of the document image is a non-standard sheet size which is not one of the standard sheet sizes;
a cropping section cropping the cropping area determined by the first determination section or the second determination section from the document image;
a coordinate calculation section calculating coordinates identifying the cropping area; and
a judgment section judging whether the cropping area is completely contained within given coordinate ranges or not, on the basis of the calculation result obtained by the coordinate calculation section,
wherein when the judgment section judges that the cropping area is not completely contained within the coordinate ranges, the first determination section or the second determination section changes the cropping area such as to be completely contained within the coordinate ranges.

4. An image processing method performing a cropping process on a document image containing a text or a graphic, comprising:
an extraction step of extracting an object area containing the text or the graphic from the document image;
an instruction reception step of receiving an instruction whether a size of the document image is one of pre-stored standard sheet sizes or not;
a first determination step of determining a cropping area surrounding the object area with given margins on the basis of the object area extracted during the extraction step and the standard sheet sizes when the instruction that the size of the document image is one of the standard sheet sizes is received by the instruction reception step;
a setting reception step of receiving setting of the margins;
a second determination step of determining the cropping area on the basis of the object area extracted during the extraction step and the setting of the margins received during the setting reception step when the instruction that the size of the document image is a non-standard sheet size which is not one of the standard sheet sizes is received by the instruction reception step;
a cropping step of cropping the cropping area determined by the first determination step or the second determination step from the document image;
a coordinate calculation step of calculating coordinates identifying the cropping area; and
a judgment step of judging whether the cropping area is completely contained within given coordinate ranges or not, on the basis of the calculation result obtained by the coordinate calculation step,
wherein when it is judged by the judgment step that the cropping area is not completely contained within the coordinate ranges, the cropping area is changed such as to be completely contained within the coordinate ranges during the first determination step or the second determination step.

5. A non-transitory computer-readable recording medium recording a computer program for causing a computer provided with a storage section storing standard sheet sizes to perform a cropping process on a document image containing a text or a graphic, the computer program comprising:
an extraction step of causing the computer to extract an object area containing the text or the graphic from the document image;
an instruction reception step of causing the computer to receive an instruction whether a size of the document image is one of the standard sheet sizes stored in the storage section or not;
a first determination step of causing the computer to determine a cropping area surrounding the object area with given margins on the basis of the object area extracted during the extraction step and the standard sheet sizes stored in the storage section when the instruction that the size of the document image is one of the standard sheet sizes is received by the instruction reception step;
a second determination step of causing the computer to determine the cropping area on the basis of the object area extracted during the extraction step and setting of the margins when the instruction that the size of the document image is a non-standard sheet size which is not one of the standard sheet sizes is received by the instruction reception step;
a cropping step of causing the computer to crop the cropping area determined by the first determination step or the second determination step from the document image;
a coordinate calculation step of causing the computer to calculate coordinates identifying the cropping area; and
a judgment step of causing the computer to judge whether the cropping area is completely contained within given coordinate ranges or not, on the basis of the calculation result obtained by the coordinate calculation step,
wherein when it is judged by the judgment step that the cropping area is not completely contained within the coordinate ranges, the cropping area is changed such as to be completely contained within the coordinate ranges during the first determination step or the second determination step.

* * * * *